United States Patent
Kim et al.

(10) Patent No.: US 11,392,247 B2
(45) Date of Patent: *Jul. 19, 2022

(54) FOLDABLE ELECTRONIC DEVICE AND METHOD FOR DETECTING TOUCH INPUT IN FOLDABLE ELECTRONIC DEVICE

(71) Applicant: SAMSUNG ELECTRONICS CO., LTD., Suwon-si (KR)

(72) Inventors: Minuk Kim, Suwon-si (KR); Hoondo Heo, Suwon-si (KR); Jiyong Kim, Suwon-si (KR); Keunsik Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,060

(22) Filed: Jan. 26, 2021

(65) Prior Publication Data

US 2021/0149542 A1 May 20, 2021

Related U.S. Application Data

(63) Continuation of application No. 16/715,330, filed on Dec. 16, 2019, now Pat. No. 10,908,738.

(30) Foreign Application Priority Data

Dec. 17, 2018 (KR) .................. 10-2018-0163077

(51) Int. Cl.
   *G06F 3/041* (2006.01)
   *G06F 3/044* (2006.01)
   *G06F 1/16* (2006.01)

(52) U.S. Cl.
   CPC ........ *G06F 3/04186* (2019.05); *G06F 1/1641* (2013.01); *G06F 3/044* (2013.01);
   (Continued)

(58) Field of Classification Search
   CPC .... G06F 3/04186; G06F 3/044; G06F 1/1616; G06F 1/1618; G06F 1/1641;
   (Continued)

(56) References Cited

U.S. PATENT DOCUMENTS 10,908,738 B2 * 2/2021 Kim .................. G06F 1/1677
11,112,838 B2 * 9/2021 Sung ................. G06F 1/1694
(Continued)

FOREIGN PATENT DOCUMENTS

JP   2000-242393        9/2000
JP   2017-142570 A      8/2017
(Continued)

OTHER PUBLICATIONS

International Search Report and Written Opinion dated Mar. 24, 2020 in counterpart International Patent Application No. PCT/KR2019/017835.

(Continued)

*Primary Examiner* — Tom V Sheng
(74) *Attorney, Agent, or Firm* — Nixon & Vanderhye P.C.

(57) ABSTRACT

Various embodiments relate to a foldable electronic device and a method for detecting a touch input by a foldable electronic device. The method may include: detecting an angle between a first housing and a second housing; and adjusting a touch-sensing sensitivity on at least a portion of a third side adjacent to a first side to be lower than a touch-sensing sensitivity on the first side based on a touch input being detected on the first side where the angle is smaller than a specified angle.

6 Claims, 23 Drawing Sheets

(52) U.S. Cl.
CPC .. *G06F 1/1647* (2013.01); *G06F 2203/04105* (2013.01); *G06F 2203/04108* (2013.01)

(58) Field of Classification Search
CPC ......... G06F 1/1643; G06F 2203/04105; G06F 2203/04108; G06F 1/1647
USPC ........................................................ 345/174
See application file for complete search history.

(56) References Cited

U.S. PATENT DOCUMENTS

| | | |
|---|---|---|
| 2005/0140574 A1 | 6/2005 | Tamura |
| 2010/0225601 A1 | 9/2010 | Homma et al. |
| 2013/0229324 A1* | 9/2013 | Zhang ..................... G09G 5/14 345/1.3 |
| 2013/0321340 A1 | 12/2013 | Seo |
| 2014/0351768 A1 | 11/2014 | Park |
| 2016/0098063 A1* | 4/2016 | Lee ....................... G06F 3/1438 345/659 |
| 2016/0132074 A1* | 5/2016 | Kim ...................... G06F 1/1652 715/769 |
| 2016/0246330 A1 | 8/2016 | Kim et al. |
| 2016/0253039 A1 | 9/2016 | Heo et al. |
| 2016/0259514 A1* | 9/2016 | Sang ..................... G06F 1/1694 |
| 2016/0357489 A1 | 12/2016 | Dong |
| 2016/0381014 A1* | 12/2016 | Kim ...................... G06F 1/1616 726/7 |
| 2017/0038909 A1 | 2/2017 | Urakawa |
| 2017/0045996 A1* | 2/2017 | Ka ........................ G09G 3/035 |
| 2017/0102738 A1 | 4/2017 | Park et al. |
| 2017/0206863 A1* | 7/2017 | An .......................... G06F 3/0481 |
| 2017/0229100 A1 | 8/2017 | Chun |
| 2017/0293383 A1 | 10/2017 | Lee |
| 2018/0059721 A1* | 3/2018 | Akimoto ............... G06F 1/1618 |
| 2018/0121056 A1* | 5/2018 | Kyoya .................. G06F 1/1652 |
| 2018/0329574 A1 | 11/2018 | Klein et al. |
| 2019/0042042 A1 | 2/2019 | Hei |
| 2019/0042066 A1 | 2/2019 | Kim |
| 2019/0138179 A1* | 5/2019 | Xia ....................... G06F 1/1643 |
| 2019/0286273 A1 | 9/2019 | Kim et al. |
| 2020/0213431 A1 | 7/2020 | Liao |
| 2020/0264657 A1 | 8/2020 | Lee |
| 2020/0365110 A1* | 11/2020 | Iyer ...................... G06F 1/1652 |

FOREIGN PATENT DOCUMENTS

| | | |
|---|---|---|
| KR | 10-2016-0104177 A | 9/2016 |
| KR | 10-2017-0047057 | 5/2017 |
| KR | 10-2018-0132847 | 12/2018 |
| WO | WO 2018/066843 A1 | 4/2018 |

OTHER PUBLICATIONS

Kim et al., U.S. Appl. No. 16/715,330, filed Dec. 16, 2019.
Extended European Search Report dated Nov. 17, 2021 for EP Application No. 19898134.2.
India Office Action dated Sep. 8, 2021 for IN Application No. 201924052212.

* cited by examiner

FOLDABLE ELECTRONIC DEVICE AND METHOD FOR DETECTING TOUCH INPUT IN FOLDABLE ELECTRONIC DEVICE

CROSS-REFERENCE TO RELATED APPLICATION

This application is a continuation of U.S. application Ser. No. 16/715,330, filed on Dec. 16, 2019, which claims priority to Korean Patent Application No. 10-2018-0163077, filed Dec. 17, 2018. The contents of each of these applications are incorporated herein in their entirety.

BACKGROUND

1) Field

The disclosure relates to a foldable electronic device and a method for detecting a touch input by a foldable electronic device.

2) Description of Related Art

Recently, research and development of foldable electronic devices having a housing switching between a folded state and an unfolded state with respect to a hinge structure has been actively conducted. A foldable electronic device makes it possible to expand the area of a display in the unfolded state and to reduce the volume in the folded state, and is thus expected to be a next-generation electronic device capable of increasing user convenience.

A foldable electronic device may include a first housing structure and a second housing structure, which are disposed to face each other in a folded state, and a display including a first area formed in the first housing structure, a second area formed in the second housing structure, and a folding area formed between the first area and the second area.

However, if a user touches the folding area (or an area adjacent to the folding area) of the display with the first and second housing structures forming a certain angle, the conventional foldable electronic device may misrecognize a touch (e.g., recognize a multi-touch not intended by the user). For example, if the user touches the first area adjacent to the folding area with the first and second housing structures forming the certain angle, the user's body part (e.g., a finger) approaches the second area, and thus the conventional foldable electronic device may recognize a touch not intended by the user in the second area.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide a foldable electronic device capable of preventing and/or reducing an occurrence of a touch from being misrecognized and a method for detecting a touch input in a foldable electronic device.

An electronic device according to various example embodiments may include: a foldable housing including a hinge, a first housing connected to the hinge and including a first side facing a first direction and a second side facing a second direction opposite the first direction, and a second housing connected to the hinge and including a third side facing a third direction and a fourth side facing a fourth direction opposite the third direction, wherein the second housing is configured to be folded toward the first housing about the hinge, the first side facing the third side in a folded state of the electronic device; a display extending from the first side to the third side and defining the first side and the third side; a processor disposed in the first housing or the second housing and operatively connected to the display; and a memory operatively connected to the processor, wherein the memory may store instructions that, when executed, cause the processor to control the electronic device to: detect an angle between the first housing and the second housing; and adjust a touch-sensing sensitivity on at least a portion of the third side adjacent to the first side to be lower than a touch-sensing sensitivity on the first side based on a touch input being detected on the first side where the angle is smaller than a specified angle.

An electronic device according to various example embodiments may include: a foldable housing including a hinge, a first housing connected to the hinge and including a first side facing a first direction and a second side facing a second direction opposite the first direction, and a second housing connected to the hinge and including a third side facing a third direction and a fourth side facing a fourth direction opposite the third direction, wherein the second housing is configured to be folded toward the first housing about the hinge, the first side facing the third side in a folded state of the electronic device; a display extending from the first side to the third side and defining the first side and the third side; a processor disposed in the first housing or the second housing and operatively connected to the display; and a memory operatively connected to the processor, wherein the memory may store instructions that, when executed, cause the processor to control the electronic device to: detect an angle between the first housing and the second housing; and disregard a hovering input detected on the third side based on a touch input being detected on the first side where the angle is smaller than a specified angle.

A method for detecting an input by an electronic device according to various example embodiments may include: detecting an angle between a first housing and a second housing; and adjusting a touch-sensing sensitivity on at least a portion of a third side adjacent to a first side to be lower than a touch-sensing sensitivity on the first side based on a touch input being detected on the first side where the angle is smaller than a specified angle.

A method for detecting an input by an electronic device according to various example embodiments may include: detecting an angle between a first housing and a second housing; and disregarding a hovering input detected on a third side based on a touch input being detected on a first side where the angle is smaller than a specified angle.

An electronic device and a method according to various example embodiments may adjust a specified condition for determining a touch input based on an angle between first and second housing, thereby preventing and/or reducing an error, such as recognition of a multi-touch that may not be intended.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
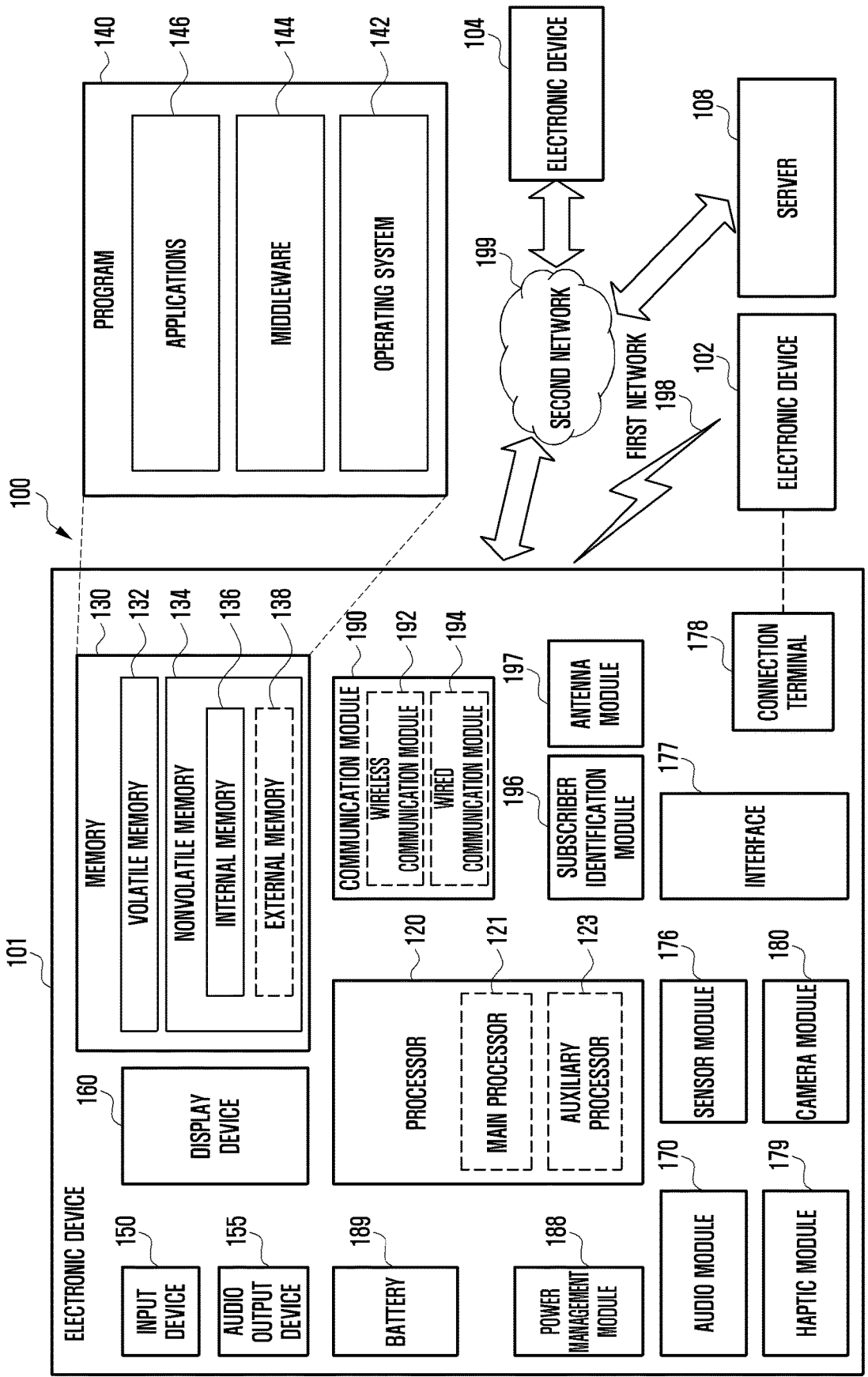
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
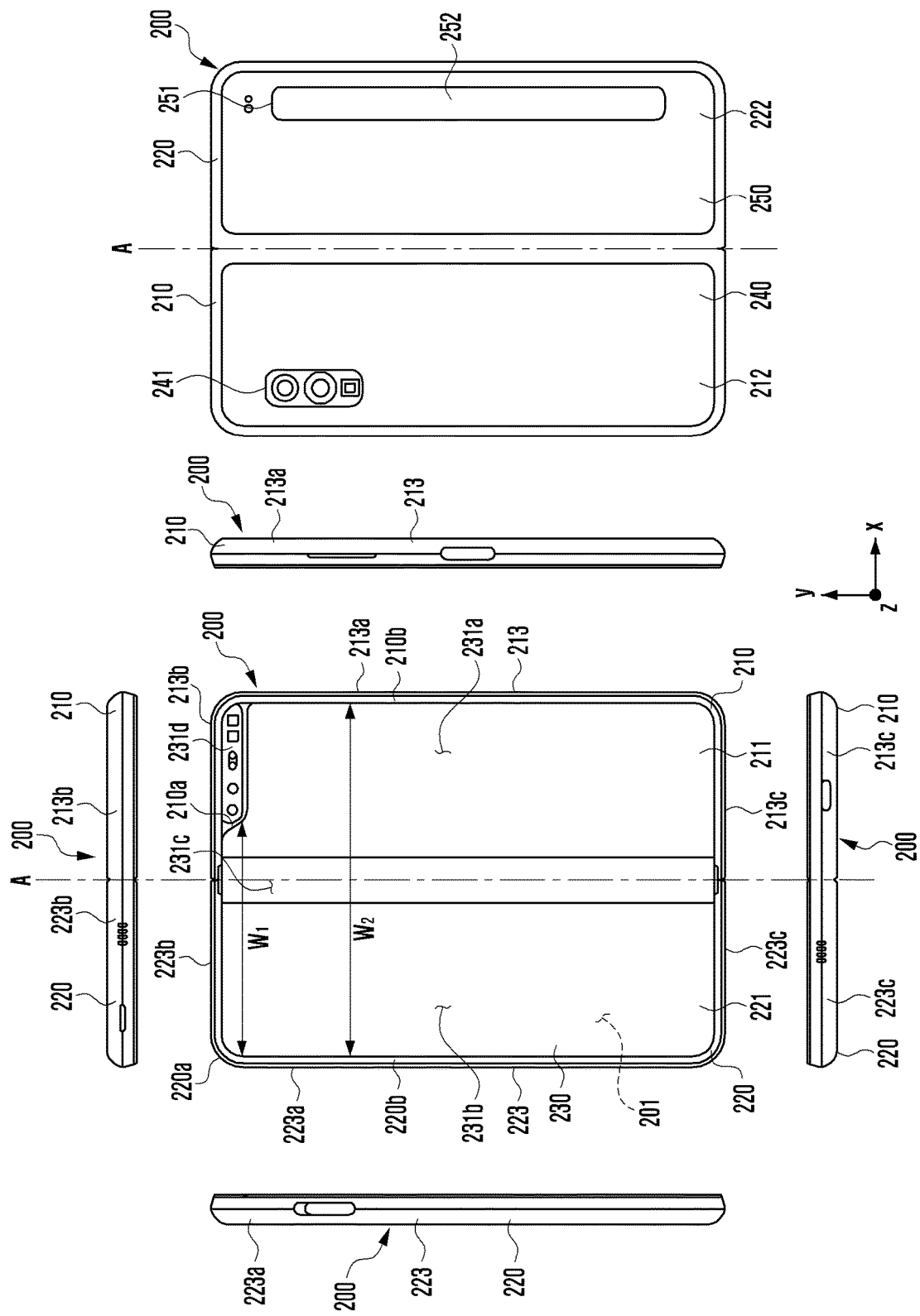
FIG. 2A is a diagram illustrating an unfolded state of an example electronic device according to various embodiments.
Figure 2B:
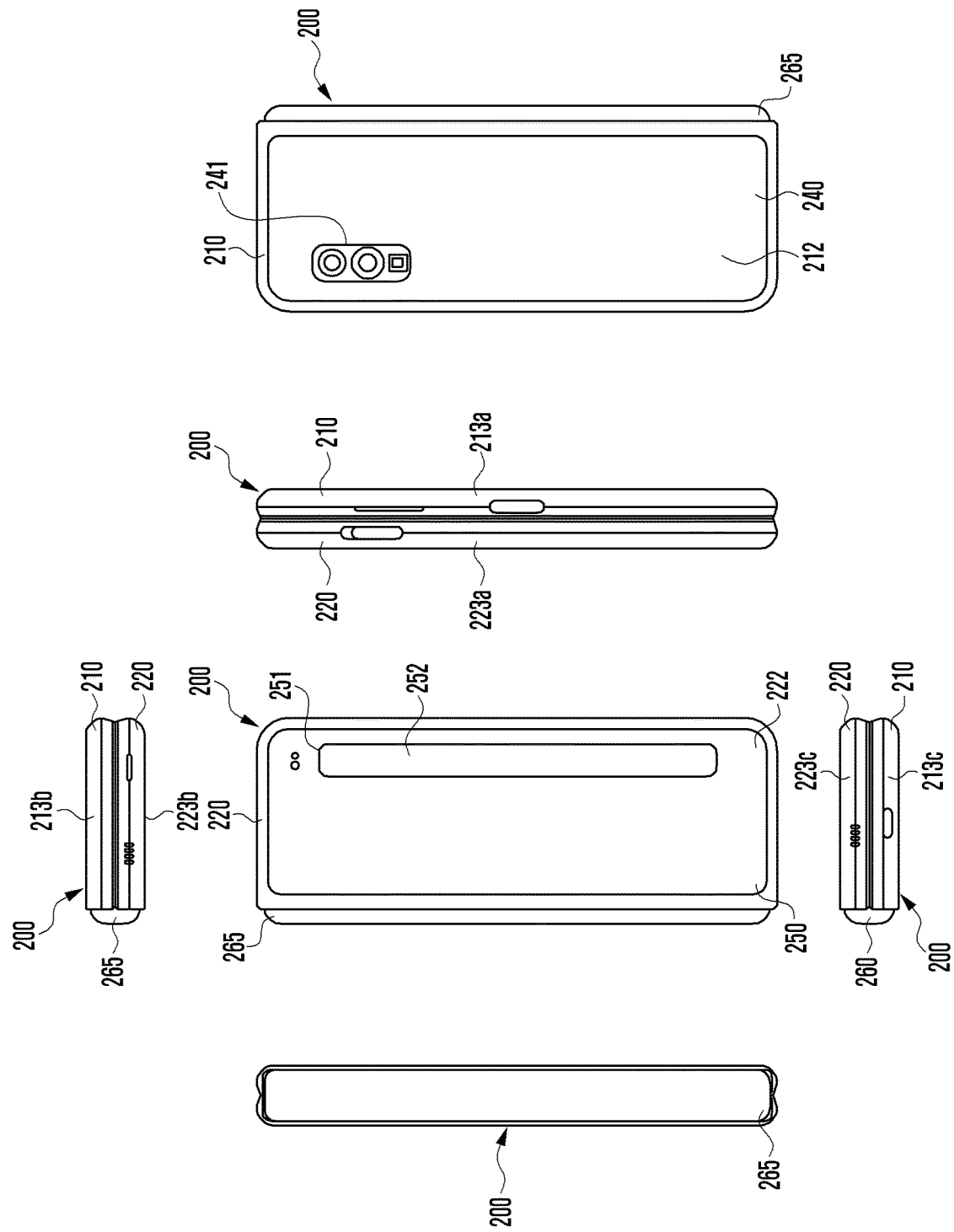
FIG. 2B is a diagram illustrating a folded state of the example electronic device of FIG. 2A according to various embodiments.

FIG. 2A is a diagram illustrating an unfolded state of an electronic device 200 according to various embodiments. FIG. 2B is a diagram illustrating a folded state of the electronic device 200 of FIG. 2A according to various embodiments.

The electronic device 200 illustrated in FIG. 2A and FIG. 2B may be at least partially similar to the electronic device 101 of FIG. 1 or may include other embodiments of an electronic device.

Referring to FIG. 2A, the electronic device 200 may include a pair of housing structures 210 and 220 rotatably coupled through a hinge, e.g., a hinge structure (e.g., a hinge structure 264 of FIG. 3) to be folded with respect to each other, a hinge cover 265 to cover a foldable portion of the pair of housing structures 210 and 220, and a display 230 (e.g., a flexible display or a foldable display) disposed in a space formed by the pair of housing structures 210 and 220. The terms hinge and hinge structure may be used interchangeably herein. In this disclosure, a side on which the display 230 is disposed may be defined as a front side of the electronic device 200, and the opposite side of the front side may be defined as a rear side of the electronic device 200. In addition, a side surrounding a space between the front side and the rear side may be defined as a lateral side of the electronic device 200.

In an example embodiment, the pair of housing structures 210, 220 may include a first housing structure 210 including a sensor area 231d, a second housing structure 220, a first rear cover 240, and a second rear cover 250. The pair of housing structures 210 and 220 of the electronic device 200 is not limited to the shape and the combination illustrated in FIG. 2A and FIG. 2B but may be configured in different shapes or by different combinations and/or coupling of components. For example, in another embodiment, the first housing structure 210 and the first rear cover 240 may be formed in a single body, and the second housing structure 220 and the second rear cover 250 may be formed in a single body.

According to an example embodiment, the first housing structure 210 and the second housing structure 220 may be disposed on opposite sides with respect to a folding axis (axis A) and may generally be symmetric with respect to the folding axis (axis A). According to an example embodiment, the angle or the distance between the first housing structure 210 and the second housing structure 220 may vary depending on whether the electronic device 200 is in a flat stage or a closed state, a folded state, or an intermediate state. According to an example embodiment, the first housing structure 210 further includes the sensor area 231d in which various sensors are disposed, unlike the second housing structure 220, but may have a shape symmetric to that of the second housing structure 220 excluding the sensor area. In another embodiment, the sensor area 231d may be further disposed in or may be replaced with at least a portion of the second housing structure 220.

In an example embodiment, the first housing structure 210 may be connected to the hinge structure (e.g., the hinge structure 264 of FIG. 3) in the flat state of the electronic device 200 and may include a first side 211 disposed to face the front side of the electronic device 200, a second side 212 disposed to look in the opposite direction of the first side 211, and a first lateral side member 213 to surround at least a portion of a space between the first side 211 and the second side 212. In an example embodiment, the first lateral side member 213 may include a first lateral side 213a disposed parallel with the folding axis (axis A), a second lateral side 213b extending in a direction perpendicular to the folding axis extends from one end of the first lateral side 213a, and a third lateral side 213c extending from the other end of the first lateral side 213a in the direction perpendicular to the folding axis (axis A).

In an example embodiment, the second housing structure 220 may be connected to the hinge structure (e.g., the hinge structure 264 of FIG. 3) in the flat state of the electronic device 200 and may include a third side 221 disposed to face the front side of the electronic device 200, a fourth side 222 disposed to look in the opposite direction of the third side 221, and a second lateral side member 223 to surround at least a portion of a space between the third side 221 and the fourth side 222. In an example embodiment, the second lateral side member 223 may include a fourth lateral side 223a disposed parallel with the folding axis (axis A), a fifth lateral side 223b extending in a direction perpendicular to the folding axis extends from one end of the fourth lateral side 223a, and a sixth lateral side 223c extending from the other end of the fourth lateral side 223a in the direction perpendicular to the folding axis (axis A). In an example embodiment, the third side 221 may face the first side 211 in the folded state.

In an example embodiment, the electronic device 200 may include a recess 201 formed to accommodate the display 230 through the structural shape combination of the first housing structure 210 and the second housing structure 220. The recess 201 may have substantially the same size as the display 230. In an example embodiment, due to the sensor area 231d, the recess 201 may have two or more different widths in the direction perpendicular to the folding axis (A axis). For example, the recess 201 may have a first width W1 between a first portion 220*a* parallel with the folding axis (axis A) in the second housing structure 220 and a first portion 210*a* formed on the edge of the sensor area 231*d* in the first housing structure 210 and a second width W2 between a second portion 220*b* of the second housing structure 210 and a second portion 210*b* that does not corresponds to the sensor area 231*d* and is parallel with the folding axis (axis A) in the first housing structure 210. In this case, the second width W2 may be longer than the first width W1. For example, the recess 201 may be formed to have the first width W1 from the first portion 210*a* of the first housing structure 210 to the first portion 220*a* of the second housing structure 220, in which the first housing structure 210 and the second housing structure 220 are shaped to be asymmetric, and the second width W2 from the second portion 210*b* of the first housing structure 210 to the second portion 220*b* of the second housing structure 220, in which the first housing structure 210 and the second housing structure 220 are shaped to be symmetric. In an example embodiment, the first portion 210*a* and the second portion 210*b* of the first housing structure 210 may be formed to have different distances from the folding axis (axis A). The width of the recess 201 is not limited to the illustrated example. In various embodiments, the recess 201 may have two or more different widths depending on the shape of the sensor are 213*d* or a portion in which the first housing structure 210 and the second housing structure 220 are shaped to be asymmetric.

In an example embodiment, at least a portion of the first housing structure 210 and the second housing structure 220 may be formed of a metallic material or a nonmetallic material having a selected rigidity in order to support the display 230.

In an example embodiment, the sensor area 231*d* may be formed to be adjacent to one corner of the first housing structure 210 and to have a certain region. However, the arrangement, shape, or size of the sensor area 231*d* is not limited to the illustrated example. For example, in another embodiment, the sensor area 231*d* may be provided in another corner of the first housing structure 210 or in any region between upper and lower corners. In another embodiment, the sensor area 231*d* may be disposed in at least a portion of the second housing structure. In another embodiment, the sensor area 231*d* may be disposed to extend in the first housing structure 210 and the second housing structure 220. In an example embodiment, the electronic device 200 may include components for providing various functions, which are disposed to be exposed on the front side of the electronic device 200 through the sensor area 213*d* or through one or more openings provided in the sensor area 231*d*. In various embodiments, the components may include, for example, at least one of a front camera device, a receiver, a proximity sensor, an illuminance sensor, an iris recognition sensor, an ultrasonic sensor, or an indicator.

In an example embodiment, the first rear cover 240 may be disposed on the second side 212 of the first housing structure 210 and may have a substantially rectangular periphery. In an example embodiment, at least a portion of the periphery may be covered by the first housing structure 210. Similarly, the second rear cover 250 may be disposed on the fourth side 222 of the second housing structure 220, and at least a portion of the periphery of the second rear cover 250 may be covered by the second housing structure 220.

In the illustrated embodiment, the first rear cover 240 and the second rear cover 250 may be shaped to be substantially symmetric with respect to the folding axis (axis A). In another embodiment, the first rear cover 240 and the second rear cover 250 may include various different shapes. In another embodiment, the first rear cover 240 may be formed with the first housing structure 210 in a single body, and the second rear cover 250 may be formed with the second housing structure 220 in a single body.

In an example embodiment, the first rear cover 240, the second rear cover 250, the first housing structure 210, and the second housing structure 220 may be coupled with each other to provide a space in which various components (e.g., a printed circuit board, an antenna module, a sensor module, or a battery) of the electronic device 200 may be disposed. In an example embodiment, one or more components may be disposed or may be visually exposed on the rear side of the electronic device 200. For example, one or more components or sensors may be visually exposed through a first rear area 241 of the first rear cover 240. In various embodiments, the sensor may include a proximity sensor, a rear camera device, and/or a flash. In another embodiment, at least a portion of a sub-display 252 may be visually exposed through a second rear area 251 of the second rear cover 250.

The display 230 may be disposed in a space formed by the foldable housings 210 and 220. For example, the display 230 may be seated in a recess (e.g., the recess 201 of FIG. 2A) formed by the pair of housing structures 210 and 220 and may be disposed to occupy substantially the entirety of the front side of the electronic device 200. Accordingly, the front side of the electronic device 200 may include the display 230 and a portion (e.g., a peripheral area) of the first housing structure 210 and a portion (e.g., a peripheral area) of the second housing structure 220, which are adjacent to the display 230. In an example embodiment, the rear side of the electronic device 200 may include the first rear cover 240, a portion (e.g., a peripheral area) of the first housing structure 210 adjacent to the first rear cover 240, the second rear cover 250, and a portion (e.g., a peripheral area) of the second housing structure 220 adjacent to the second rear cover 250.

In an example embodiment, the display 230 may refer to a display of which at least a portion may be transformed into a flat or curved surface. In an example embodiment, the display 230 may include a folding area 231*c*, a first area 231*a* disposed on one side of the folding area 231 (e.g., a right area of the folding area 231*c*), and a second area 231*b* disposed on the other side (e.g., a left area of the folding area 231*c*). For example, the first area 231*a* may be disposed on the first side 211 of the first housing structure 210, and the second area 231*b* may be disposed on the third side 221 of the second housing structure 220. In an example embodiment, the area division of the display 230 is provided for illustration, and the display 230 may be divided into a plurality of areas (e.g., four or more areas or two areas) according to the structure or function. For example, in the embodiment illustrated in FIG. 2A, the area of the display 230 may be divided according to the folding area 231*c* or the folding axis (axis A) extending in parallel with a y-axis. In another embodiment, the area of the display 230 may be divided according to another folding area (e.g., a folding area parallel with an x-axis) or another folding axis (e.g., a folding axis parallel with the x-axis). The aforementioned area division of the display is merely a physical division based on the pair of housing structures 210 and 220 and the hinge structure (e.g., the hinge structure 264 of FIG. 3), and the display 230 may display substantially a single full screen through the pair of housing structures 210 and 220 and the hinge structure (e.g., the hinge structure 264 of FIG. 3). In an example embodiment, the first area 231*a* and the second area 231b may be symmetric with respect to the folding area 231c. Here, the first area 231a may include a notch area (e.g., a notch area 233 of FIG. 3) cut due to the presence of the sensor area 231d, unlike the second area 231b, but may have a shape symmetric to that of the second area 231b excluding the notch area. For example, the first area 231a and the second area 231b may include portions having symmetric shapes and portions having asymmetrical shapes.

Figure 3:
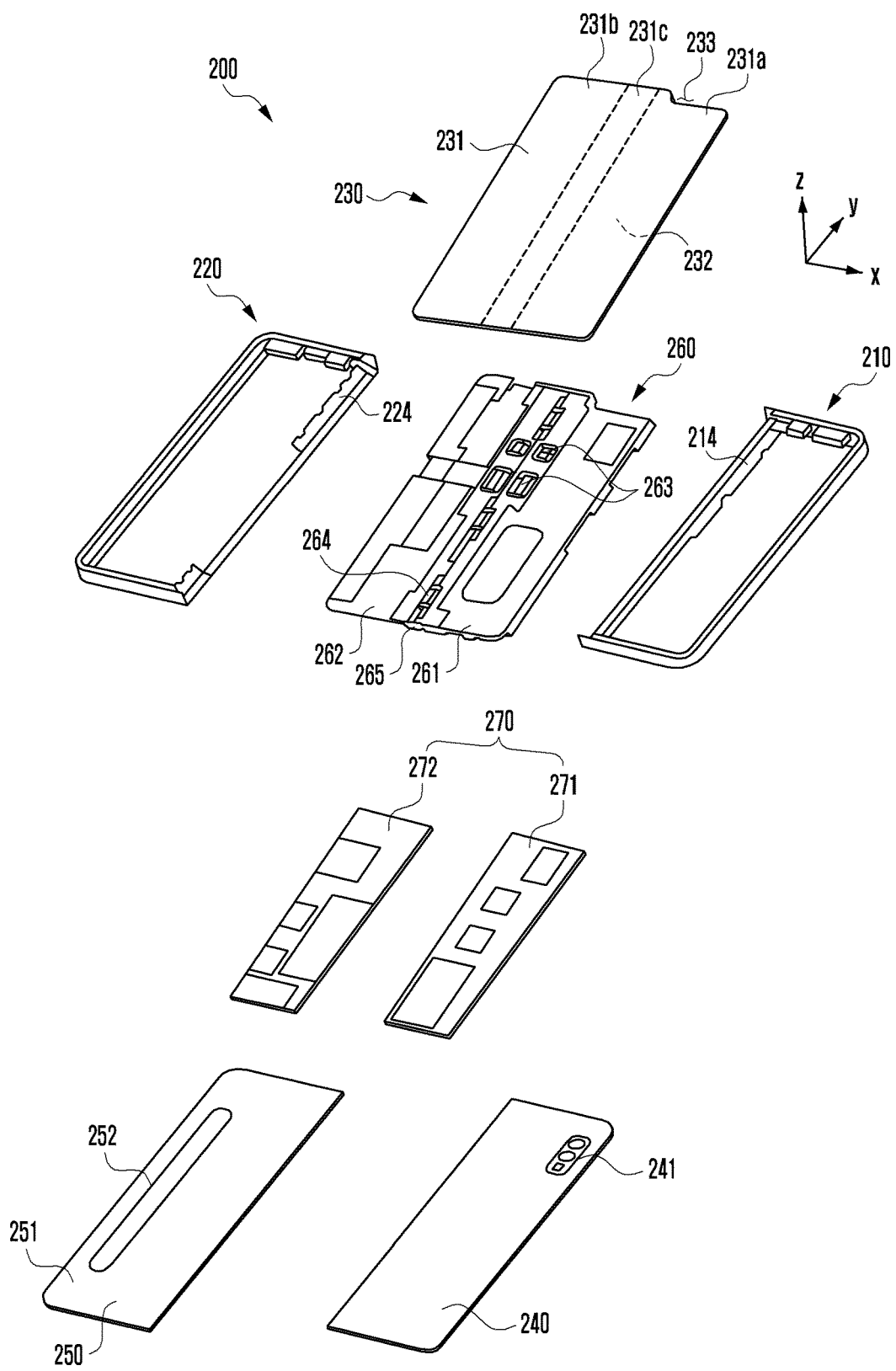
FIG. 3 is an exploded perspective view illustrating an example electronic device according to various embodiments.

Referring to FIG. 2B, the hinge cover 265 may be disposed between the first housing structure 210 and the second housing structure 220 to cover an internal component (e.g., the hinge structure 264 of FIG. 3). In an example embodiment, the hinge cover 265 may be hidden or externally exposed by a portion of the first housing structure 210 and the second housing structure 220 according to the operating state (flat state or folded state) of the electronic device 200.

For example, if the electronic device 200 is in the flat state as illustrated in FIG. 2A, the hinge cover 265 may be hidden by the first housing structure 210 and the second housing structure 220, thus not being exposed. For example, if the electronic device 200 is in the folded state (e.g., a completely folded state) as illustrated in FIG. 2B, the hinge cover 265 may be externally exposed between the first housing structure 210 and the second housing structure 220. For example, in the intermediate state in which the first housing structure 210 and the second housing structure 220 are folded with a certain angle, a portion of the hinge cover 265 may be exposed outside the electronic device 200 between the first housing structure 210 and the second housing structure 220. In this case, the exposed portion may be smaller than that in the completely folded state. In an example embodiment, the hinge cover 265 may include a curved surface.

Hereinafter, the operation of the first housing structure 210 and the second housing structure 220 and each area of the display 230 according to the operating state of the electronic device 200 (e.g., the flat state and the folded state) are described.

In an example embodiment, if the electronic device 200 is in the flat state (e.g., a state illustrated in FIG. 2A), the first housing structure 210 and the second housing structure 220 form an angle of 180 degrees, and the first area 231a and the second area 231b of the display 230 may be disposed to look in the same direction. In addition, the folding area 231c may form the same plane as the first area 231a and the second area 231b.

In an example embodiment, if the electronic device 200 is in the folded state (e.g., a state illustrated in FIG. 2B), the first housing structure 210 and the second housing structure 220 may be disposed to face each other. The first area 231a and the second area 231b of the display 230 may form a narrow angle (e.g., from 0 degrees to 10 degrees) and may face each other. At least a portion of the folding area 231c may form a curved surface having a certain curvature.

In an example embodiment, if the electronic device 200 is in the intermediate state, the first housing structure 210 and the second housing structure 220 may be disposed at a certain angle. The first area 231a and the second area 231b of the display 230 may form an angle greater than that in the folded state and smaller than that in the flat state. At least a portion of the folding area 231c may form a curved surface having a certain curvature, and the curvature may be smaller than that in the folded state.

FIG. 3 is an exploded perspective view illustrating the example electronic device 200 according to various embodiments.

Referring to FIG. 3, in an example embodiment, the electronic device 200 may include a display 230, a bracket assembly 260, at least one printed circuit board 270, a first housing structure 210, a second housing structure. 220, a first rear cover 240, and a second rear cover 250. In this disclosure, the display 230 may be referred to as a display module or display assembly.

The display 230 may include a display panel 231 (e.g., a flexible display panel) and at least one plate 232 or layer on which the display panel 231 is seated. In an example embodiment, the plate 232 may be disposed between the display panel 231 and the bracket assembly 260. The display panel 231 may be disposed on at least a portion of one side (e.g., a side in a Z direction in FIG. 3) of the plate 232. The plate 232 may be formed in a shape corresponding to the display panel 231. For example, a portion of the plate 232 may be formed in a shape corresponding to a notch area 233 of the display panel 231.

The bracket assembly 260 may include a first bracket 261, a second bracket 262, a hinge structure 264 disposed between the first bracket 261 and the second bracket 262, a hinge cover 265 to cover the hinge structure 264 when seen from the outside, a wiring member 263 (e.g., a flexible printed circuit board (FPCB)) crossing the first bracket 261 and the second bracket 262.

In an example embodiment, the bracket assembly 260 may be disposed between the plate 232 and the at least one printed circuit board 270. For example, the first bracket 261 may be disposed between a first area 231a of the display 230 and a first printed circuit board 271. The second bracket 262 may be disposed between a second area 231b of the display 230 and a second printed circuit board 272.

In an example embodiment, at least a portion of the wiring member 263 and the hinge structure 264 may be disposed in the bracket assembly 260. The wiring member 263 may be disposed in a direction (e.g., an x-axis direction) crossing the first bracket 261 and the second bracket 262. The wiring member 263 may be disposed in a direction (e.g., the x-axis direction) perpendicular to the folding axis (e.g., the y-axis or the folding axis A in FIG. 1) of a folding area 231c.

The at least one printed circuit board 270 may include, as mentioned above, the first printed circuit board 271 disposed on the first bracket 261 and the second printed circuit board 272 disposed on the second bracket 262. The first printed circuit board 271 and the second printed circuit board 272 may be disposed in a space formed by the bracket assembly 260, the first housing structure 210, the second housing structure 220, the first rear cover 240, and the second rear cover 250. Components for implementing various functions of the electronic device 200 may be mounted on the first printed circuit board 271 and the second printed circuit board 272.

In an example embodiment, the first housing structure 210 and the second housing structure 220 may be assembled to be coupled to opposite sides of the bracket assembly 260 with the display 230 coupled to the bracket assembly 260. As described below, the first housing structure 210 and the second housing structure 220 may slide on opposite sides of the bracket assembly 260 to be coupled with the bracket assembly 260.

In an example embodiment, the first housing structure 210 may include a first rotation support surface 214, and the second housing structure 520 may include a second rotation support side 224 corresponding to the first rotation support surface 214. The first rotation support surface 214 and the second rotation support surface 224 may include a curved surface corresponding to a curved surface included in the hinge cover 265.

In an example embodiment, if the electronic device 200 is in the flat state (e.g., the state in FIG. 2A), the first rotation support surface 214 and the second rotation support surface 224 may cover the hinge cover 265 so that the hinge cover 265 may not be exposed or may be minimally exposed on the rear side of the electronic device 200. In an example embodiment, if the electronic device 200 is in the folded state (e.g., the state in FIG. 2B), the first rotation support surface 214 and the second rotation support surface 224 may rotate along the curved surface included in the hinge cover 265 so that the hinge cover 265 may be maximally exposed on the rear side of the electronic device 200.

An electronic device (e.g., the electronic device 200 of FIG. 2A) according to various example embodiments may include: a foldable housing including a hinge, a first housing (e.g., the first housing structure 210 of FIG. 2A) connected to the hinge and including a first side (e.g., the first side 211 of FIG. 2A) facing a first direction and a second side facing a second direction opposite the first direction, and a second housing (e.g., the second housing structure 220 of FIG. 2A) connected to the hinge and including a third side (e.g., the third side 221 of FIG. 2A) facing a third direction and a fourth side facing a fourth direction opposite the third direction, the second housing configured to be folded to the first housing (e.g., the first housing structure 210 of FIG. 2A) about the hinge, the first side 211 facing the third side 221 in a folded state; a display extending from the first side 211 to the third side 221 and defining the first side 211 and the third side 221; a processor (e.g., the processor 120 of FIG. 1) disposed in the first housing or the second housing 220 and operatively connected to the display; and a memory (e.g., the memory 130 of FIG. 1) operatively connected to the processor, wherein the memory may store instructions that, when executed, cause the processor to control the electronic device to: detect an angle between the first housing and the second housing; and adjust a touch-sensing sensitivity on at least a portion of the third side adjacent to the first side to be lower than a touch-sensing sensitivity on the first side based on a touch input being detected on the first side where the angle is smaller than a specified angle.

The third side may include a first area adjacent to the first side and a second area other than the first area, and the memory may store instructions that, when executed, cause the processor to control the electronic device to disregard a hovering input detected in the first area based on the touch input being detected on the first side where the angle is smaller than a specified angle.

The memory may store instructions that, when executed, cause the processor to control the electronic device to determine whether a touch input occurs on the first side based on a first specified threshold value and to determine whether a touch input occurs on at least the portion of the third side based on a second specified threshold value greater than the first specified threshold value based on the touch input being detected on the first side where the angle is smaller than the specified angle.

The memory may store instructions that, when executed, cause the processor to control the electronic device to: determine whether a touch input occurs in the first area based on the second specified threshold value; and determine whether a touch input occurs in the second area based on the first specified threshold value.

The memory may store instructions that, when executed, cause the processor to control the electronic device to: detect a force input through the first area based on the touch input being detected on the first side where the angle is smaller than the specified angle; and perform a function based on the force input based on the force input being detected.

The memory may store instructions that, when executed, cause the processor to control the electronic device to: determine whether the force input is a drag input continuing from the touch input on the first side based on the force input being detected while a graphic function is executed; and display a line connecting a first line, displayed based on the touch input on the first side, and a second line, displayed based on the force input on the third side based on determining that the force input is the drag input.

The memory may store instructions that, when executed, cause the processor to control the electronic device to move at least some content displayed in a folding area positioned between the first side and the third side to the first side or the third side based on the angle being smaller than the specified angle.

The memory may store instructions that, when executed, cause the processor to control the electronic apparatus to move at least some content displayed in a folding area positioned between the first side and the third side to the third side based on the touch input being detected on the first side where the angle is smaller than the specified angle.

An electronic device (e.g., the electronic device 200 of FIG. 2A) according to various example embodiments may include: a foldable housing including a hinge, a first housing (e.g., the first housing structure 210 of FIG. 2A) connected to the hinge and including a first side (e.g., the first side 211 of FIG. 2A) facing a first direction and a second side facing a second direction opposite the first direction, and a second housing (e.g., the second housing structure of FIG. 2A) connected to the hinge and including a third side (e.g., the third side 221 of FIG. 2A) facing a third direction and a fourth side facing a fourth direction opposite the third direction, wherein the second housing is configured to be folded toward the first housing about the hinge, the first side facing the third side in a folded state of the electronic device; a display extending from the first side to the third side; a processor (e.g., the processor 120 of FIG. 1) disposed in the first housing or the second housing and operatively connected to the display; and a memory (e.g., the memory 130 of FIG. 1) operatively connected to the processor, wherein the memory may store instructions that, when executed, cause the processor to control the electronic device to: detect an angle between the first housing structure and the second housing structure; and disregard a hovering input detected on the third side based on a touch input being detected on the first side where the angle is smaller than a specified angle.

The third side may include a first area adjacent to the first side and a second area other than the first area, and the memory may store instructions that, when executed, caused the processor to control the electronic apparatus to determine whether a touch input occurs on the first side based on a first specified threshold value and to determine whether a touch input occurs on at least the portion of the third side based on a second specified threshold value greater than the first specified threshold value based on the touch input being detected on the first side where the angle is smaller than the specified angle.

A method for detecting an input by an electronic device (e.g., the electronic device 200 of FIG. 2A) according to various example embodiments may include: detecting an angle between a first housing (e.g., the first housing structure 210 of FIG. 2A) and a second housing (e.g., the second housing structure 220 of FIG. 2A); and adjusting a touch-sensing sensitivity on at least a portion of a third side (e.g., the third side 221 of FIG. 2A) adjacent to a first side (e.g., the first side 211 of FIG. 2A) to be lower than a touch-sensing sensitivity on the first side based on a touch input being detected on the first side where the angle is smaller than a specified angle.

The third side may include a first area adjacent to the first side and a second area other than the first area, and the adjusting of the touch-sensing sensitivity on at least the portion of the third side may include disregarding a hovering input detected in the first area based on the touch input being detected on the first side where the angle is smaller than a specified angle.

The method may include determining whether a touch input occurs on the first side based on a first specified threshold value and determining whether a touch input occurs on at least the portion of the third side based on a second specified threshold value greater than the first specified threshold value based on the touch input being detected on the first side where the angle is smaller than the specified angle.

The method may include: determining whether a touch input occurs in the first area based on the second specified threshold value; and determining whether a touch input occurs in the second area based on the first specified threshold value.

The method may include: detecting a force input through the first area based on the touch input being detected on the first side where the angle is smaller than the specified angle; and performing a function based on the force input based on the force input being detected.

The method may include: determining whether the force input is a drag input continuing from the touch input on the first side based on the force input being detected while a graphic function is executed; and displaying a line connecting a first line, displayed based on the touch input on the first side, and a second line, displayed based on the force input on the third side based on determining that the force input is the drag input.

The method may include: moving at least some content displayed in a folding area positioned between the first side and the third side to the first side or the third side based on the angle being smaller than the specified angle.

The method may include: moving at least some content displayed in a folding area positioned between the first side and the third side to the third side based on the touch input being detected on the first side where the angle is smaller than the specified angle.

A method for detecting an input by an electronic device (e.g., the electronic device 200 of FIG. 2A) according to various example embodiments may include: detecting an angle between a first housing (e.g., the first housing structure 210 of FIG. 2A) and a second housing (e.g., the second housing structure 220 of FIG. 2A); and disregarding a hovering input detected on a third side (e.g., the third side 221 of FIG. 2A) based on a touch input being detected on a first side (e.g., the first side 221 of FIG. 2A) where the angle is smaller than a specified angle.

The third side may include a first area adjacent to the first side and a second area other than the first area, and the method may include determining whether a touch input occurs on the first side based on a first specified threshold value and determining whether a touch input occurs on at least the portion of the third side based on a second specified threshold value greater than the first specified threshold value if the touch input is detected on the first side where the angle is smaller than the specified angle.

Figure 4:
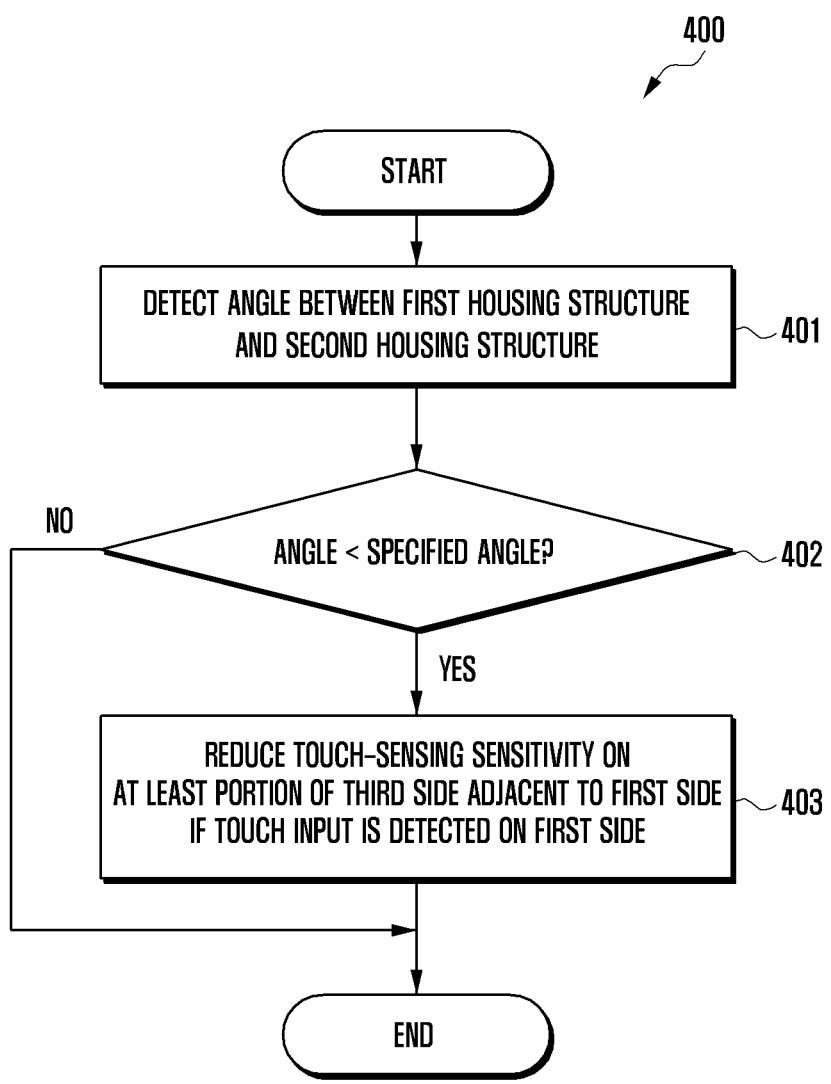
FIG. 4 is a flowchart illustrating an example operation of an electronic device according to various embodiments.
Figure 5:
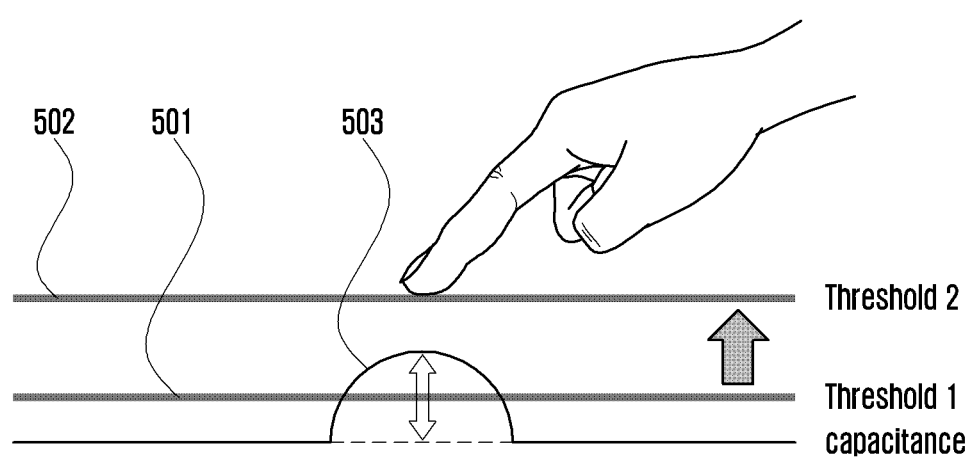
FIG. 5 is a diagram illustrating an example threshold value for determining whether a touch input occurs according to various embodiments.
Figure 6:
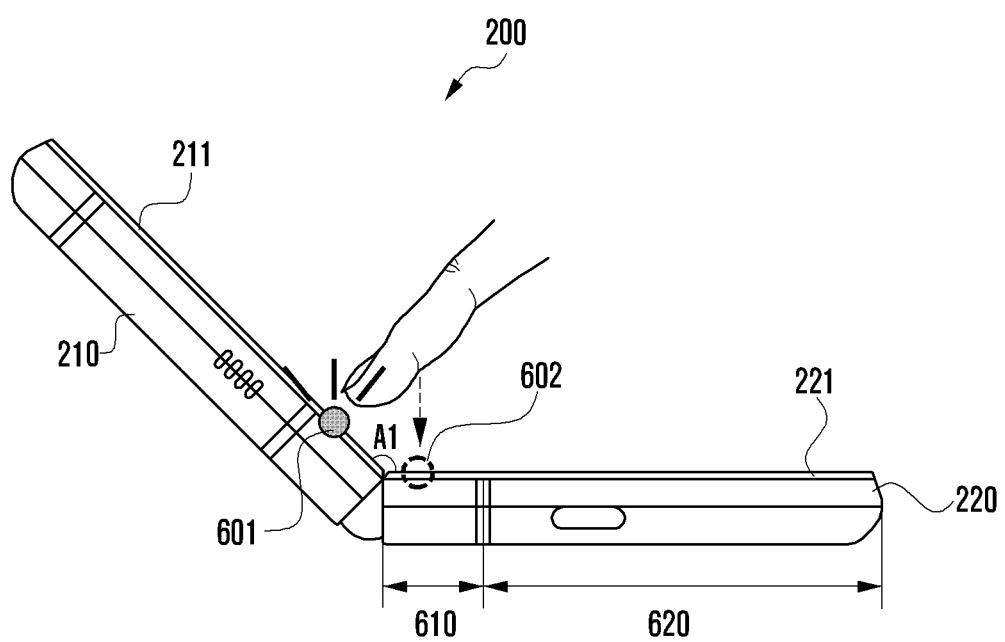
FIG. 6 illustrates an operation of an electronic device disregarding a hovering input according to various embodiments.

FIG. 4 is a flowchart 400 illustrating an example operation of an electronic device according to various embodiments. FIG. 5 is a diagram illustrating a threshold value for determining whether a touch input occurs according to various embodiments. FIG. 6 is a diagram illustrating an example operation of an electronic device disregarding a hovering input according to various embodiments.

Hereinafter, the operation of an electronic device according to various embodiments will be described in greater detail below with reference to FIGS. 4, 5 and FIG. 6.

In operation 401, the electronic device (e.g., the electronic device 200 of FIG. 2A) according to various embodiments may detect an angle between a first housing structure (e.g., the first housing structure 210 of FIG. 2A) and a second housing structure (e.g., the second housing structure 220 of FIG. 2A). For example, the electronic device 200 may detect an angle formed by a first side (e.g., the first side 211 of FIG. 2A) of the first housing structure 210 and a third side (e.g., the third side 221 of FIG. 2A) of the second housing structure 220. According to an example embodiment, the electronic device 200 may obtain the angle formed between the first housing structure 210 and the second housing structure 220 using an angle sensor. For example, the angle sensor may be disposed on a hinge of the electronic device 200 to obtain the angle formed between the first housing structure 210 and the second housing structure 220 and may transmit the obtained angle to a processor (e.g., the processor 120 of FIG. 1). According to an example embodiment, the angle sensor may be a geomagnetic sensor, a gyro sensor, or an acceleration sensor.

In operation 402, the electronic device 200 according to various embodiments may determine whether the angle (e.g., A1 in FIG. 6) between the first housing structure 210 and the second housing structure 220 is smaller than a specified angle. For example, the electronic device 200 may determine whether the angle (e.g., A1 in FIG. 6) formed by the first side 211 of the first housing structure 210 and the third side 221 of the second housing structure 220 is smaller than the specified angle. According to an example embodiment, the specified angle may be 120 degrees. For example, if the angle (e.g., A1 in FIG. 6) formed by the first side 211 of the first housing structure 210 and the third side 221 of the second housing structure 220 ranges from 30 degrees to 120 degrees, the electronic device 200 may determine that the result of the determination in operation 402 is 'Yes'.

In operation 403, if a touch input is detected on the first side 211 where the angle (e.g., A1 in FIG. 6) between the first housing structure 210 and the second housing structure 220 is smaller than the specified angle (e.g., in the case where the result of the determination in operation 402 is 'Yes'), the electronic device 200 according to various embodiments may reduce the touch-sensing sensitivity on at least a portion of the third side 221 adjacent to the first side 211.

According to an example embodiment, reducing the touch-sensing sensitivity by the electronic device 200 may refer, for example, to increasing a threshold value for determining the occurrence of a touch input by a touch sensor of a display (e.g., the display 230 of FIG. 2A). For example, the electronic device 200 may detect a change in capacitance caused by an approach or touch of a user's body part through the touch sensor, and may determine that a touch input has occurred if the change in capacitance is greater than the threshold value. The electronic device 200 partially adjusts the threshold value for determining the occurrence of the touch input based on the angle between the first housing structure 210 and the second housing structure 220, thereby preventing and/or reducing user-unintended multi-touch recognition. For example, if the angle is smaller than the specified angle, the electronic device 200 may adjust the threshold value to be different on the first side 211 and on the second side. In another example, if a touch input is detected on the first side 211 where the angle is smaller than the specified angle, the electronic device 200 may increase the threshold value on at least a portion of the third side 221, thereby avoiding determining that a touch input has occurred on at least the portion of the third side 221.

According to an example embodiment, as illustrated in FIG. 5, the display 230 may include a capacitive touch sensor, and the touch sensor may be configured by default to determine the occurrence of a touch input based on a first specified threshold value 501. The touch sensor may detect a capacitance 503 caused by a body part touching (or approaching) the display 230, and may determine that a touch input has occurred if the capacitance 503 is greater than the first specified threshold value 501. According to an example embodiment, if a touch input is detected on the first side 211 where the angle (e.g., A1 in FIG. 6) is smaller than the specified angle, the electronic device 200 may maintain the threshold value on the first side 211 at the first specified threshold value 501 and may adjust the first specified threshold value 501 to a second specified threshold value 502, which is greater than the first specified threshold value 501, on at least the portion of the third side 221. For example, if a touch input is detected on the first side 211 where the angle (e.g., A1 in FIG. 6) is smaller than the specified angle, the electronic device 200 may determine whether a touch input occurs on the first side 211 based on the first specified threshold value 501 and may determine whether a touch input occurs on at least the portion of the third side 221 based on the second specified threshold value 502.

In another example embodiment, referring to FIG. 6, the third side 221 of the display 230 may include a first area 610 adjacent to the first side 211 and a second area 620 other than the first area 610. If a touch input 601 is detected on the first side 211 where the angle A1 is smaller than the specified angle, the electronic device 200 may determine whether a touch input occurs in the first area 610 based on the second specified threshold value 502 and may determine whether a touch input occurs in the second area 620 based on the first specified threshold value 501.

According to an example embodiment, the second specified threshold value 502 may be set to be greater than a change in capacitance detected in at least the portion (e.g., the first area 610) of the third side 221 while the user is touching the first side 211 where the angle A1 is smaller than the specified angle. Accordingly, the electronic device 200 can prevent and/or avoid a touch input from being recognized on at least a portion of the third side 221 without the user's intention while a touch input is detected on the first side 211 where the angle A1 is smaller than the specified angle According to another embodiment, reducing the touch-sensing sensitivity by the electronic device 200 may refer, for example, to disregarding a hovering input by the touch sensor of the display 230. The hovering input may be a method of detecting a user input by detecting a change in capacitance with the user's body part (e.g., a finger) not physically touching the surface of the display 230. For example, as illustrated in FIG. 6, if the user's body part (e.g., a finger) makes a touch input 601 on the first side 211 where the angle A1 between the first housing structure 210 and the second housing structure 220 is smaller than the specified angle, the touch input 601 may incur a capacitance change on at least a portion of the third side 221, but the electronic device 200 may prevent and/or reduce the capacitance change from being recognized as a hovering input 601. In another example, if the touch input 601 is detected on the first side 211 where the angle A1 is smaller than the specified angle, the electronic device 200 may disregard a capacitance change detected on at least a portion of the third side 221, thereby preventing and/or reducing a likelihood of the hovering input 602, not intended by the user, being recognized. According to an example embodiment, the first area 610 may be, for example, a portion of the folding area 231c illustrated in FIG. 2A.

Figure 7:
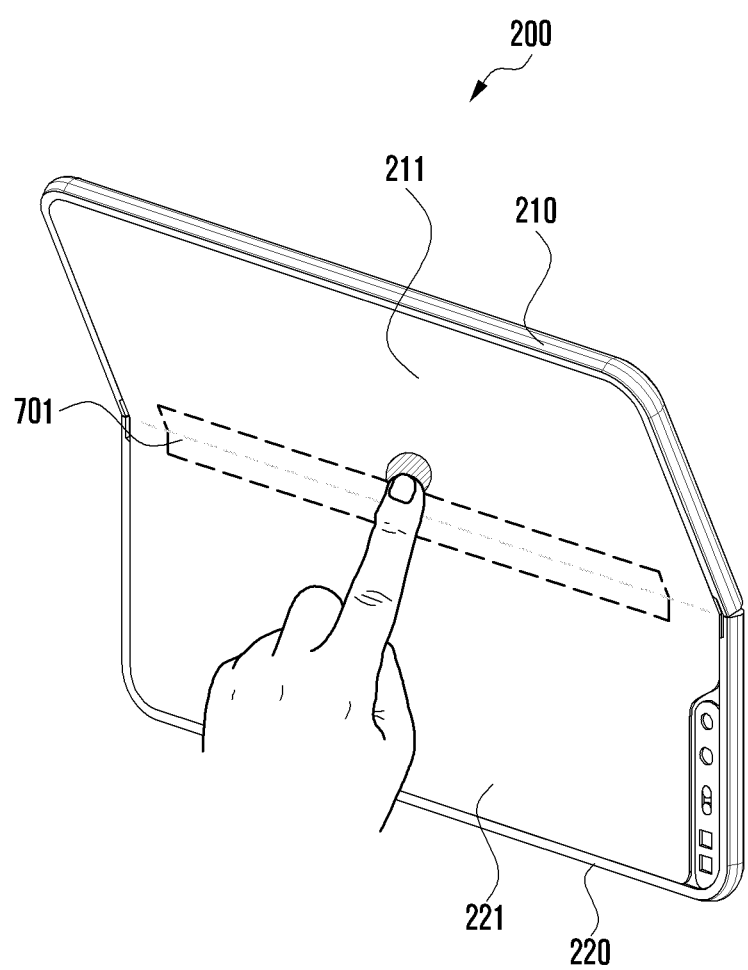
FIG. 7 is a diagram illustrating an example area in which a threshold value is adjusted according to various embodiments.

FIG. 7 is a diagram illustrating an example area in which a threshold value is adjusted according to various embodiments.

Referring to FIG. 7, an area in which touch-sensing sensitivity is adjusted by an electronic device (e.g., the electronic device 200 of FIG. 2A) according to an example embodiment based on an angle between a first housing structure (e.g., the first housing structure 210 of FIG. 2A) and a second housing structure (e.g., the second housing structure 220 of FIG. 2A) may be a folding area 701 (e.g., the folding area 231c illustrated in FIG. 2A) of a display 230. For example, if a touch input is detected on a first side (e.g., the first side 211 of FIG. 2A) where the angle is smaller than a specified angle, the electronic device 200 may determine whether a touch input occurs in the folding area based on a second specified threshold value (e.g., 502 in FIG. 5), which is greater than a first specified threshold value (e.g., 501 in FIG. 5) set by default for touch sensing. In another example, if a touch input is detected on the first side 211 where the angle is smaller than the specified angle, the electronic device 200 may disregard a hovering input detected in the folding area 701.

Figure 8:
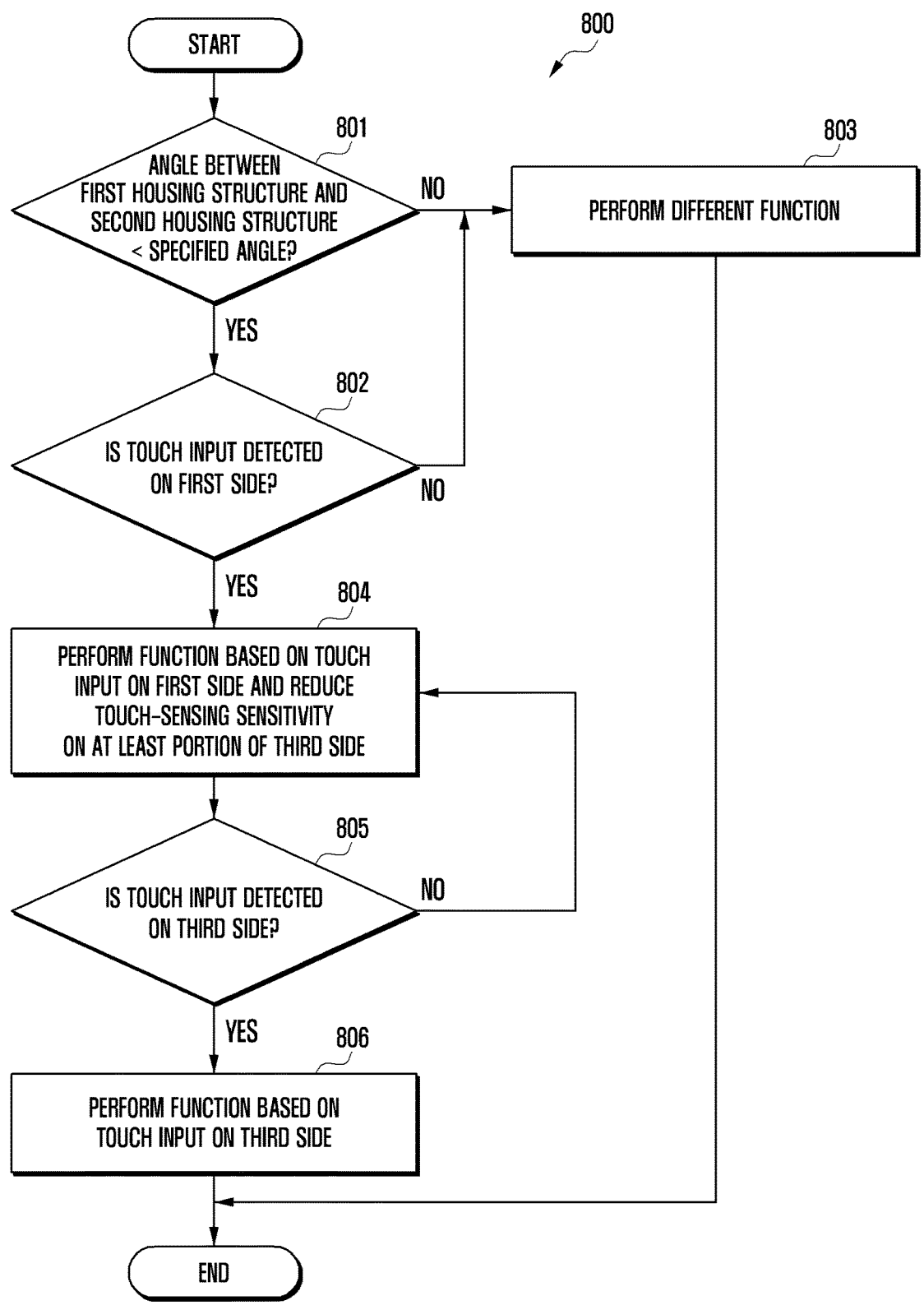
FIG. 8 is a flowchart illustrating an example operation of an electronic device according to various embodiments embodiment.
Figure 9A:
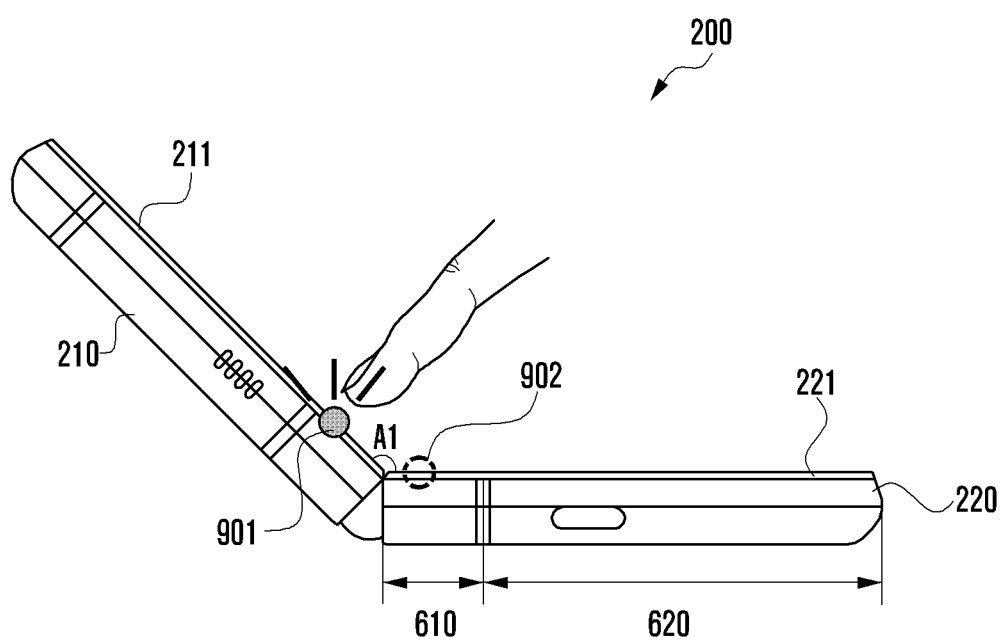
FIG. 9A is a diagram illustrating an example operation of an electronic device determining a touch input according to various embodiments.
Figure 9B:
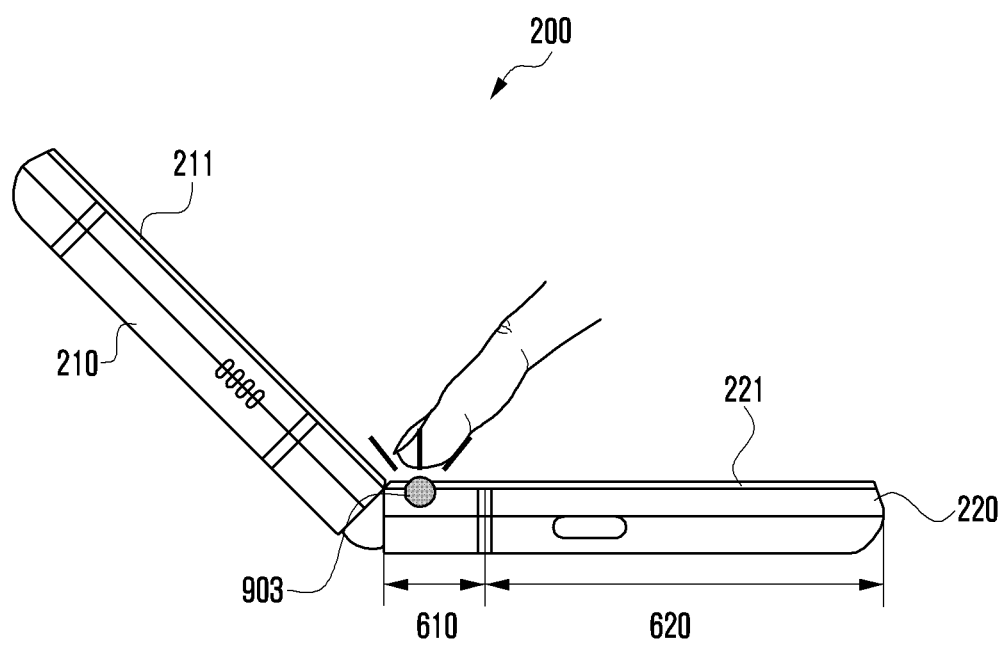
FIG. 9B is a diagram illustrating an example operation of an electronic device determining a touch input according to various embodiments.

FIG. 8 is a flowchart 800 illustrating an example operation of an electronic device according to an example embodiment. FIG. 9A is a diagram illustrating an example operation of an electronic device determining a touch input according to various embodiments, and FIG. 9B is a diagram illustrating an example operation of an electronic device determining a touch input according to various embodiments.

Hereinafter, an example operation of an electronic device according to the embodiment will be described in greater detail below with reference to FIGS. 8, 9A and 9B.

In operation 801, the electronic device (e.g., the electronic device 200 of FIG. 2A) according to the embodiment may detect an angle between a first housing structure (e.g., the first housing structure 210 of FIG. 2A) and a second housing structure (e.g., the second housing structure 220 of FIG. 2A) and may determine whether the angle is smaller than a specified angle. For example, the electronic device 200 may detect an angle formed by a first side (e.g., the first side 211 of FIG. 2A) of the first housing structure 210 and a third side (e.g., the third side 221 of FIG. 2A) of the second housing structure 220 and may determine whether the angle is smaller than the specified angle. According to the embodiment, the specified angle may be 120 degrees. For example, if the angle formed by the first side 211 of the first housing structure 210 and the third side 221 of the second housing structure 220 ranges from 30 degrees to 120 degrees, the electronic device 200 may determine that the result of the determination in operation 801 is 'Yes'.

According to the embodiment, if the angle between the first housing structure 210 and the second housing structure 220 is equal to or greater than the specified angle (e.g., the result of the determination in operation 801 is 'No'), the electronic device 200 may perform a different function in operation 803. For example, the different function may be a function performed by the electronic device 200 before performing operation 801.

In operation 802, the electronic device 200 according to the embodiment may determine whether a touch input is detected on the first side 211 where the angle between the first housing structure 210 and the second housing structure 220 is smaller than the specified angle (e.g., the result of the determination in operation 801 is 'Yes'). For example, the electronic device 200 may determine whether a touch input occurs on the first side 211 based on a first specified threshold value (e.g., 501 in FIG. 5). If a capacitance change greater than the first specified threshold value 501 is detected on the first side 211, the electronic device 200 may determine that a touch input has occurred on the first side 211.

According to the embodiment, if a touch input is not detected on the first side 211 where the angle between the first housing structure 210 and the second housing structure 220 is smaller than the specified angle (e.g., the result of the determination in operation 802 is 'No'), the electronic device 200 may perform a different function in operation 803. For example, the different function may be a function performed by the electronic device 200 before performing operation 801.

In operation 804 and operation 805, if a touch input is detected on the first side 211 where the angle between the first housing structure 210 and the second housing structure 220 is smaller than the specified angle (e.g., the result of the determination in operation 802 is 'Yes'), the electronic device 200 according to the embodiment may perform a function based on the touch input on the first side 211 and may reduce touch-sensing sensitivity on at least a portion of the third side 221. An operation of reducing the touch-sensing sensitivity on at least the portion of the third side 221 by the electronic device 200 may be the same as or similar to operation 403 in FIG. 4.

For example, if a touch input is detected on the first side 211 where the angle is smaller than the specified angle, the electronic device 200 may maintain a threshold value on the first side 211 at the first specified threshold value 501 and may adjust the first specified threshold value 501 to a second specified threshold value (e.g., 502 in FIG. 5), which is greater than the first specified threshold value 501, on at least the portion of the third side 221. If a touch input is detected on the first side 211 where the angle is smaller than the specified angle, the electronic device 200 may determine whether a touch input occurs on the first side 211 based on the first specified threshold value 501 and may determine whether a touch input occurs on at least the portion of the third side 221 based on the second specified threshold value 502.

Referring to FIG. 9A, if a touch input 901 is detected on the first side 211, the electronic device 200 according to the embodiment may adjust a threshold value for determining the occurrence of a touch input on at least the portion of the third side 221 to the second specified threshold value 502, thereby preventing and/or reducing a likelihood that the touch input 901 on the first side 211 from being recognized as a touch 902 (or a hovering input) also detected on at least the portion of the third side 901 without the user's intention. According to the embodiment, if a capacitance change, which is lower than the second specified threshold value 502, is detected on at least the portion of the third side 221, the electronic device 200 may determine that no touch input has occurred on the third side 221 (e.g., the result of the determination in operation 805 is 'No') and may maintain an operation of determining the occurrence of a touch input on at least the portion of the third side 221 based on the second specified threshold value 502.

Referring to FIG. 9B, if a capacitance change, which is greater than the second specified threshold value 502, is detected on at least the portion of the third side 221, the electronic device 200 according to the embodiment may determine that a touch input 903 has occurred on at least the portion of the third side 221 (e.g., the result of the determination in operation 805 is 'Yes').

In operation 806, if it is determined that a touch input has occurred on at least the portion of the third side 221 based on the second specified threshold value 502 (e.g., the result of the determination in operation 805 is 'Yes'), the electronic device 200 according to the embodiment may perform a function based on the touch input on the third side 221. For example, the electronic device 200 may detect a user input to select a specified object (e.g., an icon) disposed on at least the portion of the third side 221 based on the second specified threshold value 502 and may perform a function corresponding to the specified object in response to the user input.

Figure 10:
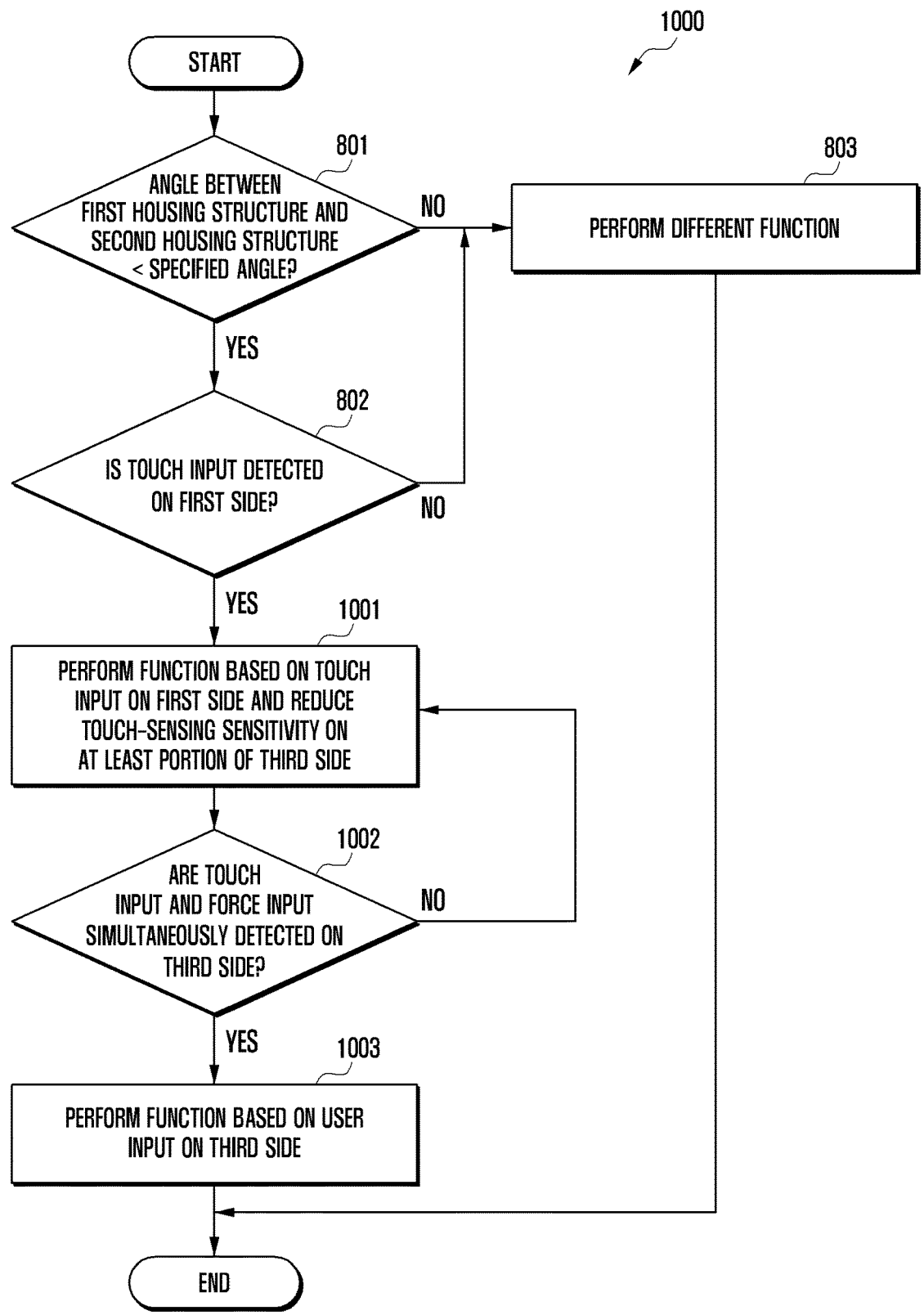
FIG. 10 is a flowchart illustrating an example operation of an electronic device according to various embodiments.
Figure 11A:
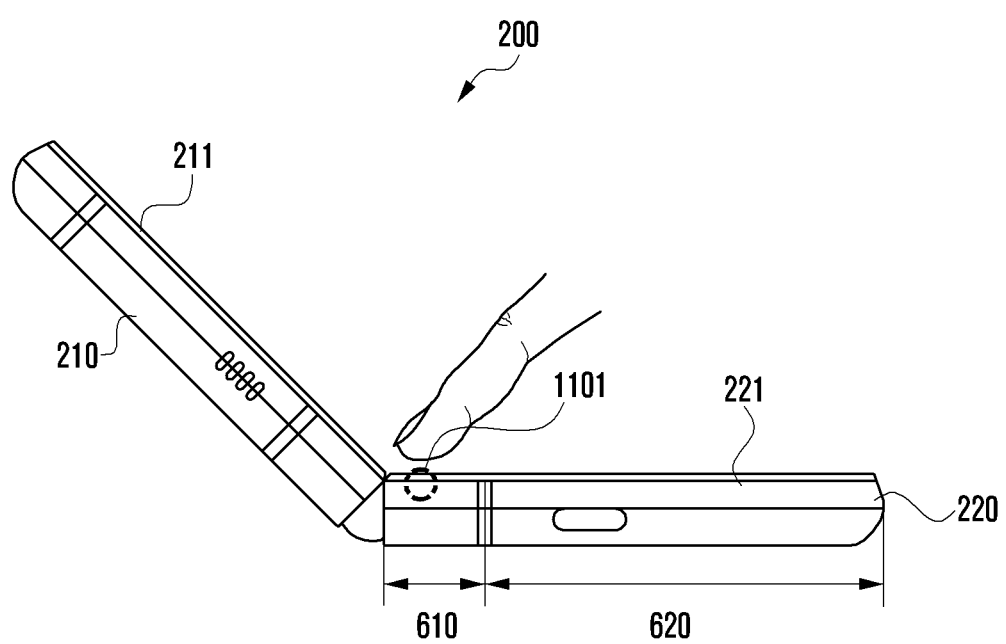
FIG. 11A is a diagram illustrating an example operation of an electronic device based on a force input according to various embodiments.
Figure 11B:
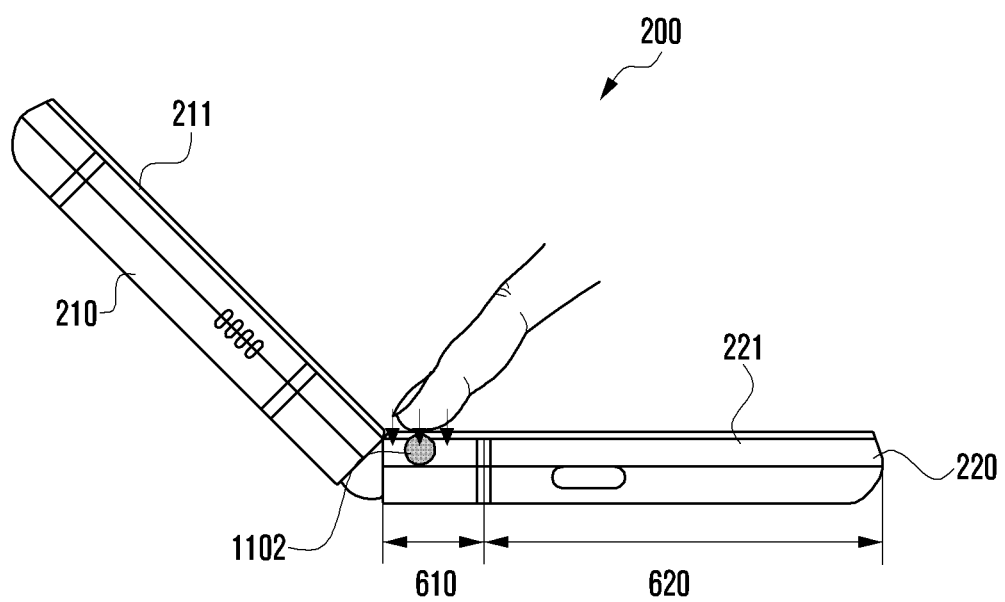
FIG. 11B is a diagram illustrating an example operation of an electronic device based on a force input according various embodiments.

FIG. 10 is a flowchart 1000 illustrating an example operation of an electronic device according to various embodiments. FIG. 11A is a diagram illustrating an example operation of an electronic device based on a force input according to various embodiments, and FIG. 11B is a diagram illustrating an example operation of an electronic device based on a force input according to various embodiments.

Operations 801, 803 and 803 illustrated in FIG. 10 may be the same as or similar to operations 801, 802 and 803 illustrated in FIG. 8. In the following description, operations after operation 802 will be described in detail.

In operation 1001, if a touch input is detected on a first side (e.g., the first side 211 of FIG. 2A) where an angle between a first housing structure (e.g., the first housing structure 210 of FIG. 2A) and a second housing structure (e.g., the second housing structure 220 of FIG. 2A) is smaller than a specified angle (e.g., the result of the determination in operation 802 is 'Yes'), the electronic device 200 (e.g., the electronic device 200 of FIG. 2A) according to the embodiment may perform a function based on the touch input on the first side 211 and may reduce touch-sensing sensitivity on at least a portion of a third side (e.g., the third side 221 of FIG. 2A). An operation of reducing the touch-sensing sensitivity on at least the portion of the third side 221 by the electronic device 200 may be the same as or similar to operation 403 in FIG. 4 or operation 804 in FIG. 8.

In operation 1002, the electronic device 200 according to the embodiment may detect a touch input on at least the portion of the third side 221 based on a second specified threshold value (e.g., 502 in FIG. 5) and may additionally detect a force input. For example, the electronic device 200 may determine whether a touch input and a force input (e.g., 1102 in FIG. 11B) are simultaneously detected in a first area 610 adjacent to a folding area (e.g., the folding area 231*c* in FIG. 2A).

Referring to FIG. 11A, if only a hovering input 1101 is detected without a force input (e.g., 1102 in FIG. 11B) on at least the portion of the third side 221, the electronic device 200 may determine that no touch input has occurred on the third side 221 (e.g., the result of the determination in operation 1002 is 'No') and may maintain an operation of determining whether a touch input and a force input are simultaneously detected on at least the portion of the third side 221.

Referring to FIG. 11B, if a force input 1102 is detected on at least the portion of the third side 221, the electronic device 200 may determine that a user input has occurred on the third side 221 (e.g., the result of the determination in operation 1002 is 'Yes').

According to the embodiment, if a touch input is detected on the first side 211 where the angle between the first housing structure and the second housing structure is smaller than the specified angle (e.g., the result of the determination in operation 802 is 'Yes'), the electronic device 200 may disregard a touch input or a hovering input on at least the portion of the third side 221 and may detect only the force input 1102. For example, disregarding a touch input or a hovering input on at least the portion of the third side 221 by the electronic device 200 may be an operation of disregarding a capacitance change detected by a touch sensor on at least the portion of the third side 221 while a touch input is detected on the first side 211 where the angle is smaller than the specified angle.

In operation 1003, if the touch input and the force input 1102 are simultaneously detected on at least the portion of the third side 221 (e.g., the result of the determination in operation 1002 is 'Yes'), the electronic device 200 according to the embodiment may perform a function based on a user input (the touch input and the force input) on at least the portion of the third side 221. For example, the electronic device 200 may detect a user input to select a specified object (e.g., an icon) disposed on at least the portion of the third side 221 and may perform a function corresponding to the specified object in response to the user input.

Figure 12:
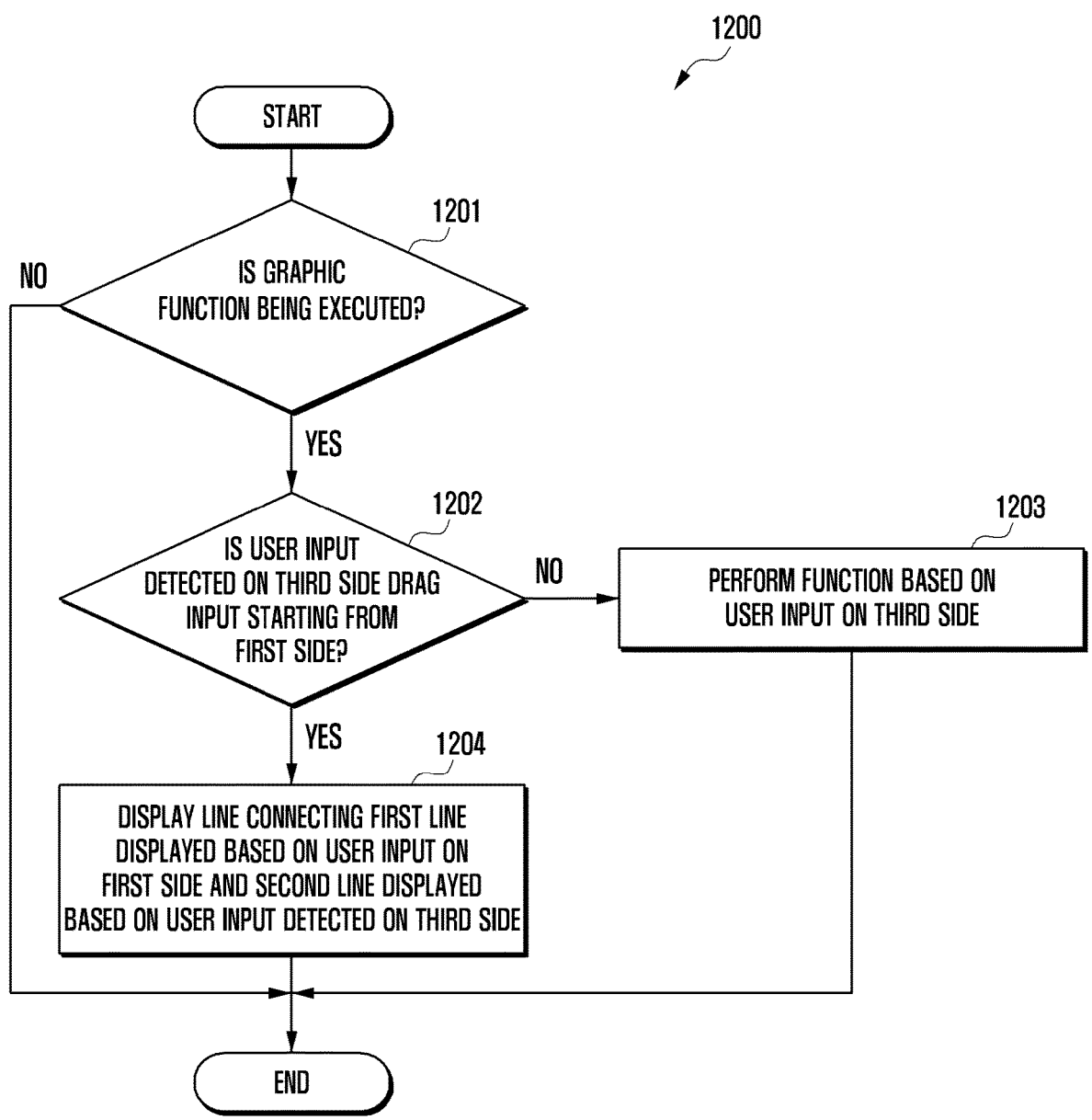
FIG. 12 is a flowchart illustrating an example operation of an electronic device according to various embodiments.
Figure 13A:
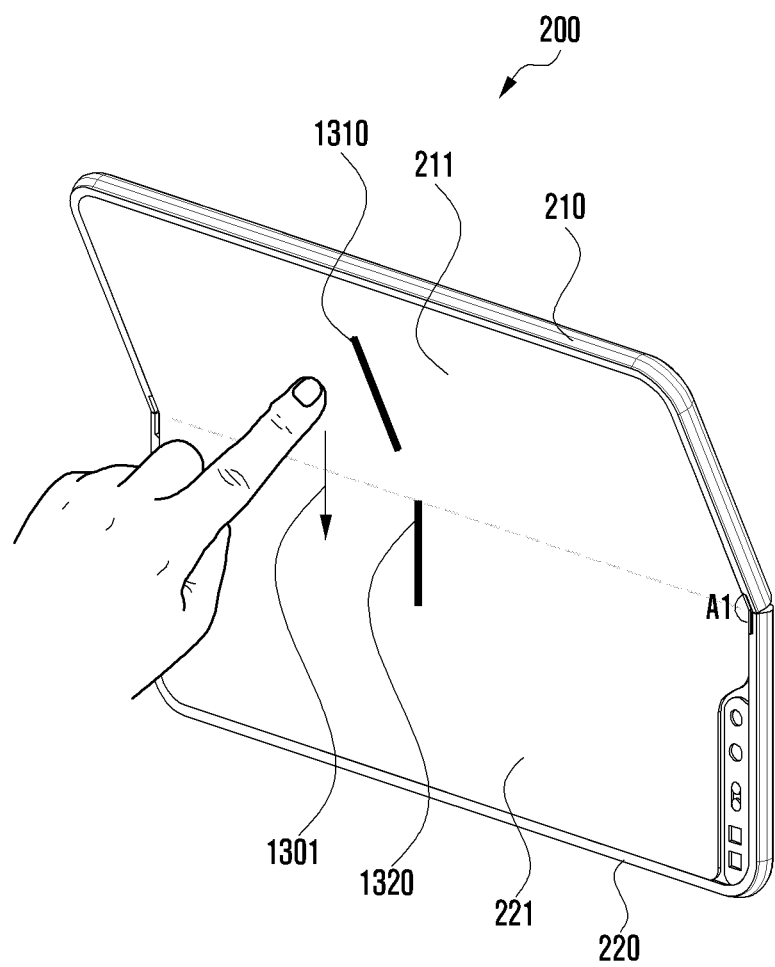
FIG. 13A is a diagram illustrating an example of performing a graphic function according to various embodiments.
Figure 13B:
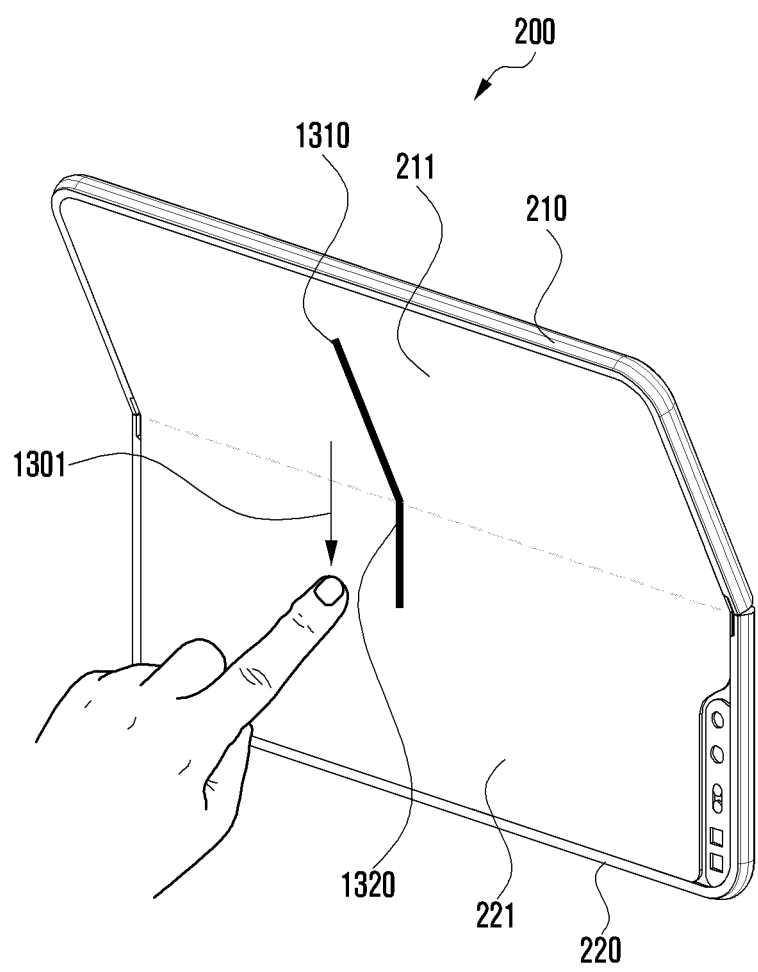
FIG. 13B is a diagram illustrating an example of performing a graphic function according to various embodiments.

FIG. 12 is a flowchart 1200 illustrating an example operation of an electronic device according to various embodiments. FIG. 13A is a diagram illustrating an example of performing a graphic function according to various embodiments, and FIG. 13B is a diagram illustrating an example of performing a graphic function according to various embodiments.

In operation 1201, the electronic device (e.g., the electronic device 200 of FIG. 2A) according to the embodiment may determine whether a graphic function is being executed where an angle between a first housing structure (e.g., the first housing structure 210 of FIG. 2A) and a second housing structure (e.g., the second housing structure 220 of FIG. 2A) is smaller than a specified angle. For example, the graphic function may be a function associated with drawing or a function associated with a handwriting input.

In operation 1202, if the graphic function is being executed (e.g., the result of the determination in operation 1201 is 'Yes'), the electronic device 200 according to the embodiment may detect a touch input on a first side (e.g., the first side 211 of FIG. 2A) and/or a third side (e.g., the third side 221 of FIG. 2A) based on a specified threshold value and, if a touch input is detected on the third side 221, may determine whether the touch input is a drag input (e.g., 1301 in FIG. 13A) starting from the first side 211. For example, if a user input is detected on the third side 221 while the graphic function is being executed, the electronic device 200 may determine whether the user input continues from the first side 211.

In operation 1203, if a user input detected on the third side 221 is not a drag input (e.g., 1301 in FIG. 13A) starting from the first side 211 (e.g., the result of the determination in operation 1202 is 'No'), the electronic device 200 according to the embodiment may perform a graphic function based on the user input (a touch input and a force input) on at least a portion of the third side 221.

In operation 1204, if the user input detected on the third side 221 is a drag input (e.g., 1301 in FIG. 13A) starting from the first side 211 (e.g., the result of the determination in operation 1202 is 'Yes'), the electronic device 200 according to the embodiment may display a line connecting a first line (e.g., 1310 in FIG. 13A), displayed based on the user input on the first side 211, and a second line (e.g., 1320 in FIG. 13B), displayed based on the user input detected on the third side 221.

For example, as illustrated in FIG. 13A, if a user makes a drag input 1301 continuing from the first side 211 to the third side 221 with the angle between the first housing structure 210 and the second housing structure 220 smaller than the specified angle during the execution, the electronic device 200 may perform an operation of reducing the touch-sensing sensitivity illustrated with reference to FIG. 8 or FIG. 10, thereby displaying the first line 1310 on the first side 211 and the second line 1320 on the third side 221 which are disconnected. Since displaying the first line 1310 and the second line 1320 in a disconnected line is not the user's intention, the electronic device 200 may display a line connecting the first line 1310, displayed based on the user input on the first side 211, and the second line 1320, displayed based on the user input detected on the third side 221, as illustrated in FIG. 13B.

Figure 14:
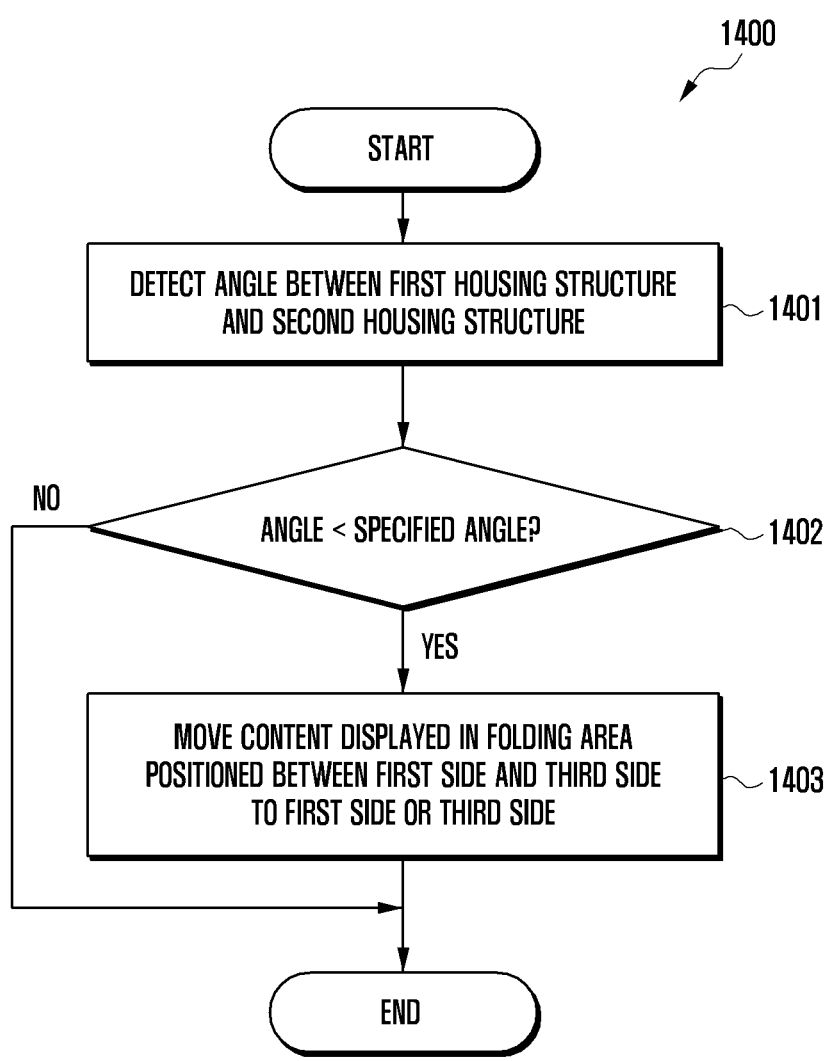
FIG. 14 is a flowchart illustrating an example operation of an electronic device according to various embodiments.
Figure 15A:
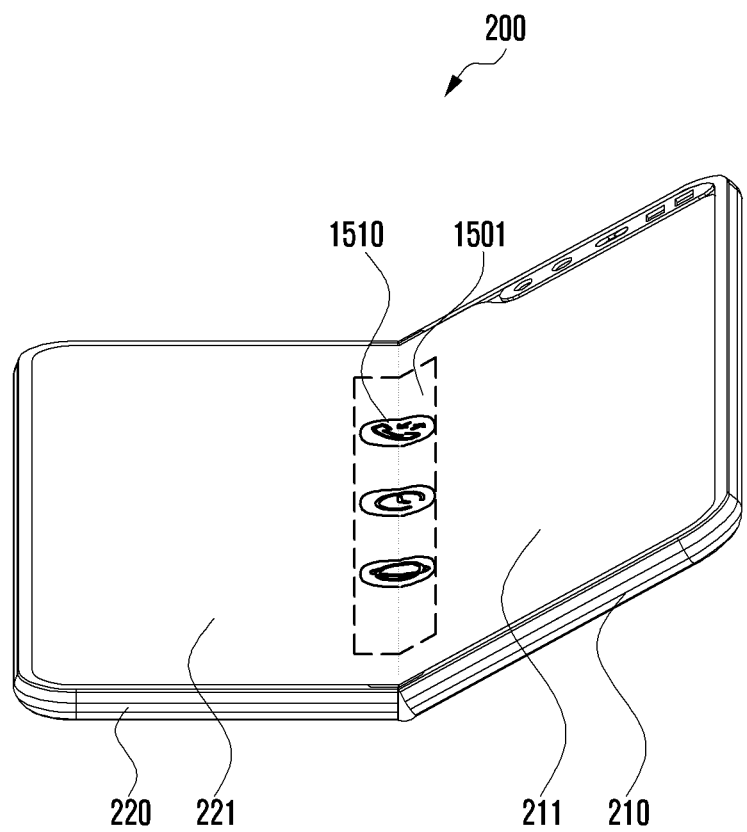
FIG. 15A is a diagram illustrating an example in which an electronic device adjusts the position of content on a display according to a first housing and a second housing defining a specified angle or less according to various embodiments.
Figure 15B:
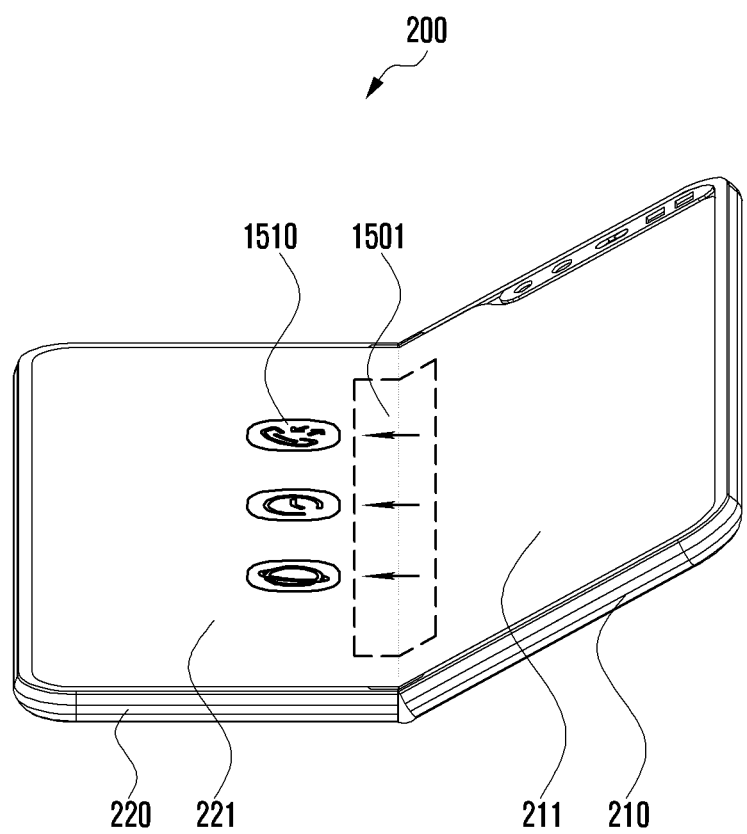
FIG. 15B is a diagram illustrating an example in which an electronic device adjusts the position of content on a display according to a first housing and a second housing defining a specified angle or less according to various embodiments.

FIG. 14 is a flowchart 1400 illustrating an example operation of an electronic device according to various embodiments. FIG. 15A is a diagram illustrating an example in which an electronic device adjusts the position of content on a display according to a first housing structure and a second housing structure forming a specified angle or less according to various embodiments, and FIG. 15B is a diagram illustrating an example in which an electronic device adjusts the position of content on a display according to a first housing structure and a second housing structure forming a specified angle or less according to various embodiments.

Operations 1401 and 1402 illustrated in FIG. 14 may be the same as or similar to operations 401 and 402 illustrated in FIG. 4. In the following description, different operations after operation 1402 (e.g., operation 402 of FIG. 4) will be described in detail.

In operation 1403, the electronic device (e.g., the electronic device 200 of FIG. 2A) according to the embodiment may move content (e.g., 1510 of FIG. 15A) displayed in a folding area (e.g., the folding area 231c illustrated in FIG. 2A) positioned between a first side (e.g., the first side 211 of FIG. 2A) and a third side (e.g., the third side 221 of FIG. 2A) to the first side 211 or the third side 221.

For example, as illustrated in FIG. 15A, if an angle between the first housing structure (e.g., the first housing structure 210 of FIG. 2A) and the second housing structure (e.g., the second housing structure 220 of FIG. 2A) is smaller than the specified angle, a user's touch input may be more likely to be misrecognized in the folding area 1501 (e.g., the folding area 231c illustrated in FIG. 2A) positioned between the first side 211 and the third side 221. To prevent and/or reduce the misrecognition, as illustrated in FIG. 15B, the electronic device 200 may move the at least one content 1510 displayed on the folding area 1501 positioned between the first side 211 and the third side 221 to the first side 211 or the third side 221, thereby preventing and/or reducing a likelihood of the user's touch on the folding area 1501.

Figure 16:
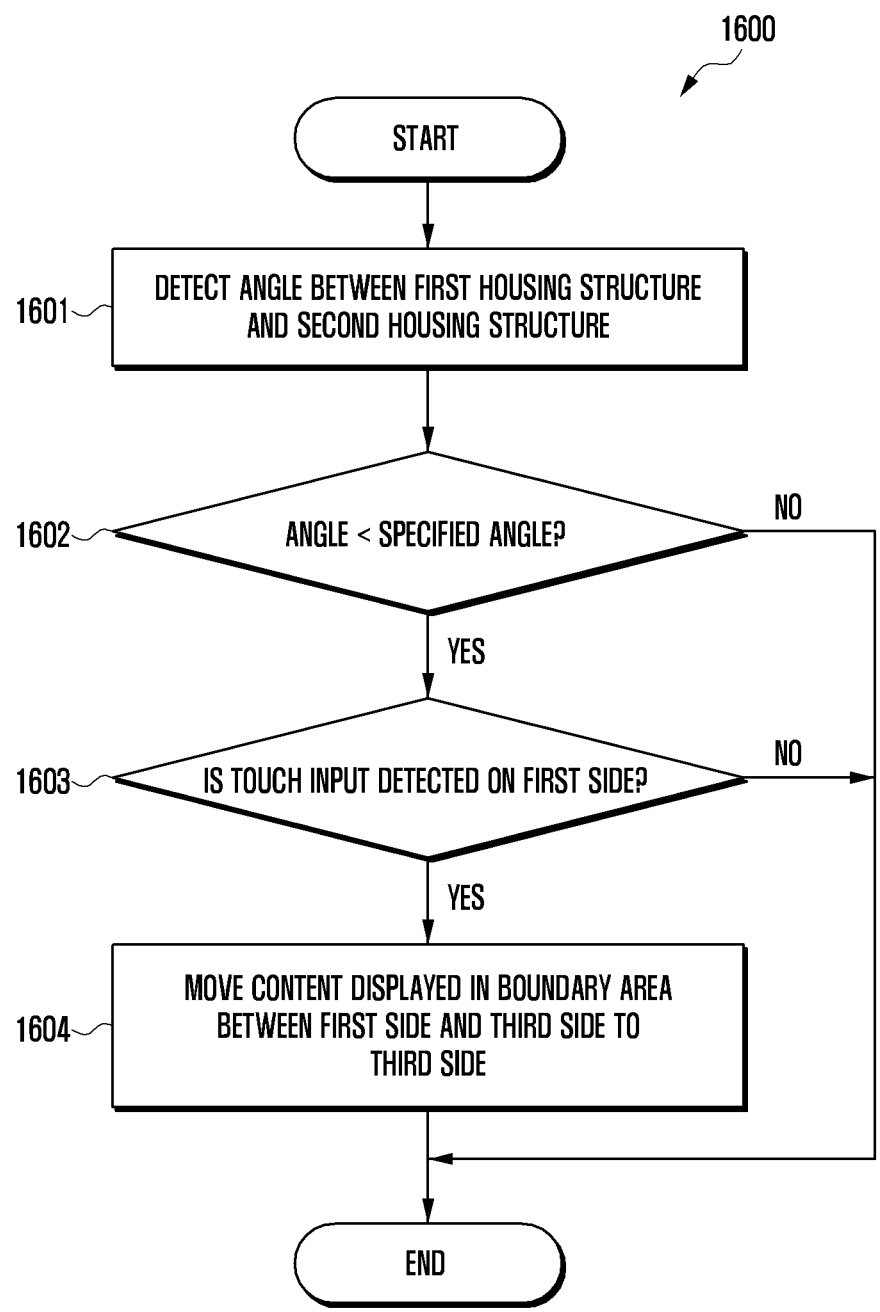
FIG. 16 is a flowchart illustrating an example operation of an electronic device according to various embodiments.
Figure 17A:
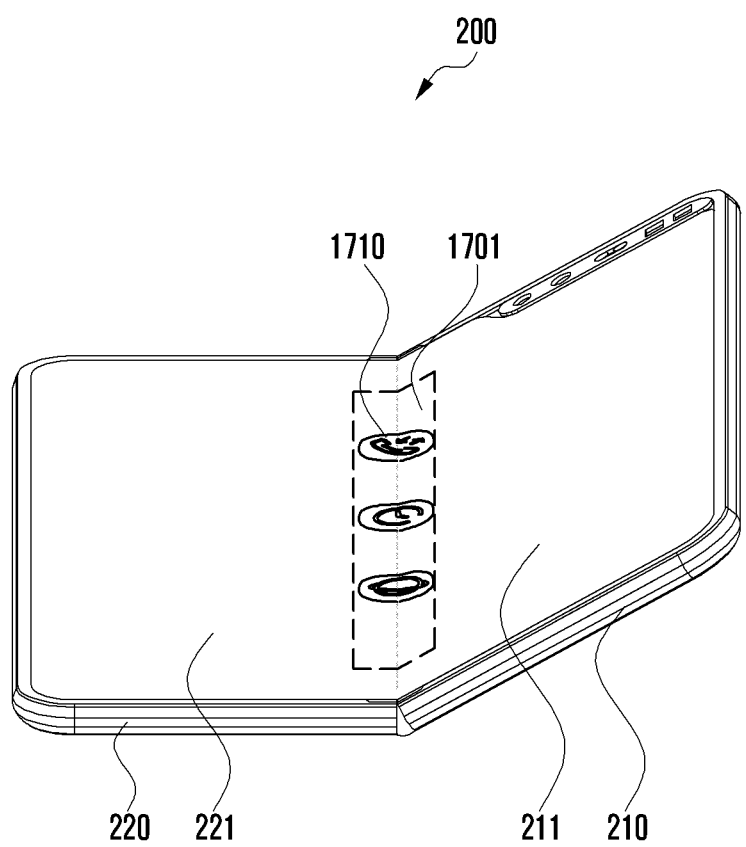
FIG. 17A is a diagram illustrating an example in which an electronic device adjusts the position of content on a display upon receiving a touch input with a first housing and a second housing defining a specified angle or less according to various embodiments.
Figure 17B:
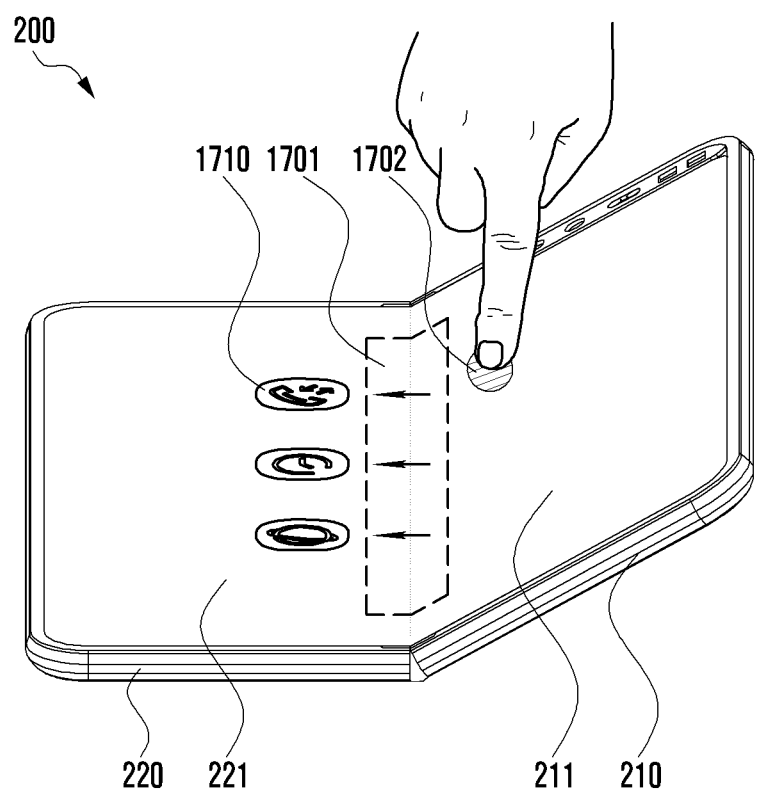
FIG. 17B is a diagram illustrating an example in which an electronic device adjusts the position of content on a display upon receiving a touch input with a first housing and a second housing defining a specified angle or less according to various embodiments.

FIG. 16 is a flowchart 1600 illustrating an example operation of an electronic device 200 according to various embodiments. FIG. 17A is a diagram illustrating an example in which an electronic device 200 adjusts the position of content on a display upon receiving a touch input with a first housing structure and a second housing structure 220 forming a specified angle or less according to various embodiments, and FIG. 17B is a diagram illustrating an example in which an electronic device 200 adjusts the position of content on a display upon receiving a touch input with a first housing structure and a second housing structure 220 forming a specified angle or less according to various embodiments.

Operations 1601 and 1602 illustrated in FIG. 16 may be the same as or similar to operations 401 and 402 illustrated in FIG. 4. In the following description, different operations after operation 1602 (e.g., operation 402 of FIG. 4) will be described in detail.

In operation 1603, the electronic device (e.g., the electronic device 200 of FIG. 2A) according to the embodiment may determine whether a touch input is detected on a first side (e.g., the first side 211 of FIG. 2A) where an angle between a first housing structure (e.g., the first housing structure 210 of FIG. 2A) and a second housing structure (e.g., the second housing structure 220 of FIG. 2A) is smaller than a specified angle (e.g., the result of the determination in operation 1602 is 'Yes'). For example, the electronic device 200 may determine whether a touch input occurs on the first side 211 based on a first specified threshold value (e.g., 501 in FIG. 5). If a capacitance change greater than the first specified threshold value 501 is detected on the first side 211, the electronic device 200 may determine that a touch input has occurred on the first side 211.

In operation 1604, if a touch input (e.g., 1702 in FIG. 17B) is detected on the first side 211 (e.g., the result of the determination in operation 1603 is 'Yes') where the angle between the first housing structure 210 and the second housing structure 220 is smaller than the specified angle, the electronic device 200 according to the embodiment may move content 1710 displayed in a folding area (e.g., the folding area 231c illustrated in FIG. 2A) positioned between the first side 211 and a third side (e.g., the third side 221 of FIG. 2A) to the first side 211 or the third side 221.

For example, as illustrated in FIG. 17A, if the angle between the first housing structure 210 and the second housing structure 220 is smaller than the specified angle, a user's touch input may be more likely to be misrecognized in the folding area 1701 (e.g., the folding area 231c illustrated in FIG. 2A) positioned between the first side 211 and the third side 221. To prevent and/or reduce the misrecognition, as illustrated in FIG. 17B, the electronic device 200 may move the at least one content 1710 displayed on the folding area 1701 upon detecting a touch input 1702 on the first side 211, thereby preventing and/or reducing a likelihood of the user's touch on the folding area 1701 being redundant.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, as set forth, for example, in the appended claims and equivalents thereof.

What is claimed is:

1. An electronic device comprising:
a foldable housing comprising a hinge, a first housing connected to the hinge and including a first side facing a first direction and a second side facing a second direction opposite to the first direction, and a second housing connected to the hinge and including a third side facing a third direction and a fourth side facing a fourth direction opposite to the third direction, the second housing configured to be foldable toward the first housing by way of the hinge, the first side facing the third side in a folded state of the electronic device;
a display extending from the first side to the third side and defining the first side and the third side; and
a processor configured to:
detect an angle between the first housing and the second housing; and
move at least some content displayed in a folding area positioned between the first side and the third side to the first side or the third side based on the angle being smaller than a first angle.

2. The electronic device of claim 1, wherein the processor is further configured to:
move at least some content displayed in a folding area positioned between the first side and the third side to the third side based on a touch input being detected on the first side where the angle is smaller than a second angle.

3. The electronic device of claim 1, wherein the processor is further configured to:
execute a function associated with graphics;
display a first line on the first side based on receiving a touch input through the first side;
display a second line on the third side based on receiving a touch input through the third side;
receive a drag input continuously moving from the first side to the third side; and
in response to the drag input, connect the first line and the second line.

4. A method for detecting an input by an electronic device, the electronic device comprising:
a foldable housing comprising a hinge, a first housing connected to the hinge and including a first side facing a first direction and a second side facing a second direction opposite to the first direction, and a second housing connected to the hinge, and including a third side facing a third direction and a fourth side facing a fourth direction opposite to the third direction, and configured to be foldable toward the first housing by way of the hinge, the first side facing the third side in a folded state of the electronic device; and
a display extending from the first side to the third side and defining the first side and the third side,
the method comprising:
detecting an angle between the first housing and the second housing; and
moving at least some content displayed in a folding area positioned between the first side and the third side to the first side or the third side based on the angle being smaller than a first angle.

5. The method of claim 4, further comprising:
moving at least some content displayed in a folding area positioned between the first side and the third side to the third side based on the touch input being detected on the first side where the angle is smaller than a second angle.

6. The method of claim 4, further comprising:
executing a function associated with graphics;
displaying a first line on the first side based on a touch input through the first side;
displaying a second line on the third side based on a touch input through the third side;
receiving a drag input continuously moving from the first side to the third side; and
in response to the drag input, connecting the first line and the second line.

* * * * *